US011281509B2

(12) United States Patent
Hershkovitz et al.

(10) Patent No.: US 11,281,509 B2
(45) Date of Patent: Mar. 22, 2022

(54) SHARED MEMORY MANAGEMENT

(71) Applicant: EMC IP Holding Company LLC, Hopkinton, MA (US)

(72) Inventors: Gabriel Hershkovitz, Newton, MA (US); Arieh Don, Newton, MA (US); Michael R. Barber, Pearland, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 43 days.

(21) Appl. No.: 16/690,467

(22) Filed: Nov. 21, 2019

(65) Prior Publication Data

US 2021/0157660 A1    May 27, 2021

(51) Int. Cl.
   *G06F 9/54* (2006.01)
   *G06F 11/34* (2006.01)
   *G06F 12/02* (2006.01)

(52) U.S. Cl.
   CPC .......... *G06F 9/544* (2013.01); *G06F 11/3476* (2013.01); *G06F 12/0238* (2013.01)

(58) Field of Classification Search
   CPC ... G06F 9/544; G06F 12/0238; G06F 11/3476
   See application file for complete search history.

(56) References Cited

U.S. PATENT DOCUMENTS

| 7,380,239 | B1 * | 5/2008 | Srivastava | .......... | G06F 11/3636 |
| | | | | | 714/45 |
| 9,135,123 | B1 * | 9/2015 | Armangau | .......... | G06F 11/1471 |
| 2006/0198385 | A1 * | 9/2006 | Szumilas | ............ | H04L 47/2433 |
| | | | | | 370/412 |
| 2007/0168993 | A1 * | 7/2007 | Gopal | ..................... | H04L 43/00 |
| | | | | | 717/128 |
| 2011/0004732 | A1 * | 1/2011 | Krakirian | ............ | G06F 12/0817 |
| | | | | | 711/147 |

OTHER PUBLICATIONS

Gabriel Hershkovitz, et al., "Multi-Core I/O Trace Analysis," U.S. Appl. No. 16/530,134, filed Aug. 2, 2019.

* cited by examiner

*Primary Examiner* — Doon Y Chow
*Assistant Examiner* — Carina Yun
(74) *Attorney, Agent, or Firm* — Muirhead and Saturnelli, LLC

(57) ABSTRACT

Techniques for memory management may include: allocating, from an allocation pool, buffers for logs used by processing cores; recording messages in the logs for the processing cores; responsive to filling a first buffer included in a first log used to record messages for a first of the plurality of processing cores, allocating a second buffer of the allocation pool for the first log; adding the second buffer to the first list of buffers for the first log; and adding the first buffer, that is included in the first list for the first log, to the allocation pool, wherein after adding the first buffer to the allocation pool, the first buffer is included in the first list of buffers for the first log and also included in the allocation pool. The buffers may be included in a distributed global memory portion of the same computing module as the processing cores.

21 Claims, 20 Drawing Sheets

500

| | Time | Trace ID | Description | Action | Computing Module ID | Core ID | Other Info |
|---|---|---|---|---|---|---|---|
| 502a | 3237 | 32 | Read Data X | Receive | A | 1 | |
| 502b | 3244 | 61 | Lock cache slot | Send | A | 1 | |
| 502c | 3266 | 55 | ACK cache locked | Receive | A | 1 | |
| 502d | 3268 | 22 | Retrieve Data X from disk | Send | A | 1 | |
| 502e | 3294 | 26 | ACK retrieve data from disk | Receive | A | 1 | |

520

| | Time | Trace ID | Description | Action | Computing Module ID | Core ID | Other Info |
|---|---|---|---|---|---|---|---|
| 522a | 3272 | 22 | Retrieve Data X from disk | Receive | A | 3 | |
| 522b | ... | ... | ... | ... | ... | ... | |
| 522c | 3292 | 26 | iACK retrieve data from disk | Send | A | 3 | |

540

| | Time | Trace ID | Description | Action | Computing Module ID | Core ID | Other Info |
|---|---|---|---|---|---|---|---|
| 542a | 3146 | 61 | Lock cache slot | Receive | B | 2 | |
| 542b | 3156 | 67 | Lock cache slot | Execute | B | 2 | |
| 542c | 3164 | 55 | ACK cache locked | Send | B | 2 | |

FIG. 5

| | Time | Trace ID | Description | Action | Computing Module ID | Core ID | Pointer |
|---|---|---|---|---|---|---|---|
| 602a | 3237 | 32 | Read Data X | Receive | A | 1 | |
| 602b | 3244 | 61 | Lock cache slot | Send | A | 1 | |
| 602c | 3266 | 55 | ACK cache locked | Receive | A | 1 | |
| 602d | 3268 | 22 | Retrieve Data X from disk | Send | A | 1 | |
| 602e | 3272 | 22 | Retrieve Data X from disk | Receive | A | 3 | |
| 602f | ... | ... | ... | ... | ... | ... | |
| 602g | 3292 | 26 | ACK retrieve data from disk | Send | A | 3 | |
| 602h | 3294 | 26 | ACK retrieve data from disk | Receive | A | 1 | |

FIG. 6

| | Time | Trace ID | Description | Action | Computing Module ID | Core ID | Pointer |
|---|---|---|---|---|---|---|---|
| 702a | 3146 | 61 | Lock cache slot | Receive | B | 2 | |
| 702b | 3156 | 67 | Lock cache slot | Execute | B | 2 | |
| 702c | 3164 | 55 | ACK cache locked | Send | B | 1 | |
| 702d | 3237 | 32 | Read Data X | Receive | A | 1 | |
| 702e | 3244 | 61 | Lock cache slot | Send | A | 1 | |
| 702f | 3266 | 55 | ACK cache locked | Receive | A | 1 | |
| 702g | 3268 | 22 | Retrieve Data X from disk | Send | A | 1 | |
| 702h | 3272 | 22 | Retrieve Data X from disk | Receive | A | 3 | |
| | ... | ... | ... | ... | ... | ... | |
| 702j | 3292 | 26 | ACK retrieve data from disk | Send | A | 3 | |
| 702k | 3294 | 26 | ACK retrieve data from disk | Receive | A | 1 | |

FIG. 7A

| | Time | Trace ID | Description | Action | Computing Module ID | Core ID | Pointer |
|---|---|---|---|---|---|---|---|
| 702d' | 3137 | 32 | Read Data X | Receive | A | 1 | |
| 702e' | 3144 | 61 | Lock cache slot | Send | A | 1 | |
| 702a | 3146 | 61 | Lock cache slot | Receive | B | 2 | |
| 702b | 3156 | 67 | Lock cache slot | Execute | B | 2 | |
| 702c | 3164 | 55 | ACK cache locked | Send | B | 1 | |
| 702f | 3166 | 55 | ACK cache locked | Receive | A | 1 | |
| 702g' | 3168 | 22 | Retrieve Data X from disk | Send | A | 1 | |
| 702h' | 3172 | 22 | Retrieve Data X from disk | Receive | A | 3 | |
| | ... | ... | ... | ... | ... | ... | |
| 702j' | 3192 | 26 | ACK retrieve data from disk | Send | A | 3 | |
| 702k' | 3194 | 26 | ACK retrieve data from disk | Receive | A | 1 | |

FIG. 7B

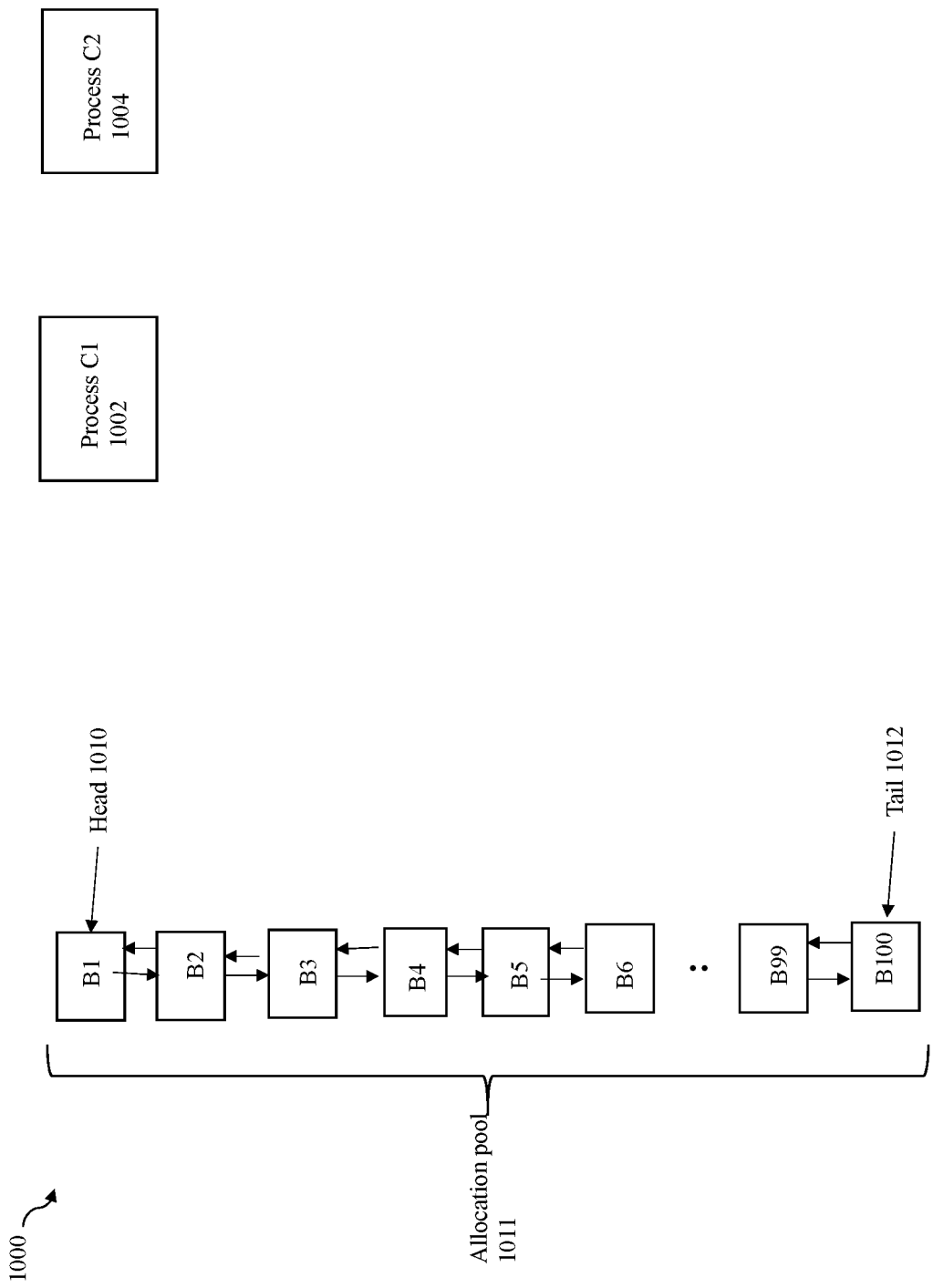

SHARED MEMORY MANAGEMENT

BACKGROUND

Technical Field

This application generally relates to management of buffer or memory space shared among multiple processors.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide any of a variety of data services to host systems of the storage network.

A host system may host applications that utilize the data services provided by one or more storage systems of the storage network to store data on the physical storage devices (e.g., tape, disks or solid state devices) thereof. For a given application, to perform I/O operations utilizing a physical storage device of the storage system, one or more components of the host system, storage system and network components therebetween may be used. Each of the one or more combinations of these components over which I/O operations between an application and a physical storage device can be performed may be considered an I/O path between the application and the physical storage device. These I/O paths collectively define a connectivity of the storage network.

SUMMARY OF THE INVENTION

In accordance with the techniques herein are a method, computer readable medium and system for memory management. Processing may include: allocating, from an allocation pool of memory, a plurality of buffers for a plurality of logs used by a plurality of processing cores, wherein each of the plurality of logs is used to log messages for a different one of the plurality of processing cores, wherein each of the plurality of buffers is included in a different one of the plurality of logs, and wherein for each of the plurality of logs, a list of buffers included in said each log is maintained, wherein a first list of buffers for a first log of the plurality of logs includes a first buffer of the plurality of buffers indicating that the first buffer is included in the first log; recording messages in the plurality of logs for the plurality of processing cores; responsive to filling the first buffer included in the first log that is used to record messages for a first processing core of the plurality of processing cores, allocating a second buffer of the allocation pool for the first log; adding the second buffer to the first list of buffers for the first log, wherein after adding the second buffer to the first list, the first list includes the first buffer and the second buffer; and adding the first buffer, that is included in the first list for the first log, to the allocation pool, wherein after adding the first buffer to the allocation pool, the first buffer is included in the first list of buffers for the first log and is also included in the allocation pool.

In at least one embodiment, the allocation pool may include a second list of buffers included in the allocation pool, and wherein buffers may be allocated from a head of the second list and buffers may be added to a tail of the second list. Adding the first buffer to the allocation pool may append the first buffer to the tail of the second list. The second buffer may be located at the head of the second list and wherein said allocating the second buffer may remove the second buffer from the second list and may add the second buffer to the first list of buffers of the first log. Buffers of the first list may be ordered based on an order in which each buffer of the first list is allocated for the first log to record events for the first processing core.

In at least one embodiment, subsequent to adding the first buffer to the allocation, processing may include: allocating a second plurality of buffers from the allocation pool for one or more of the plurality of logs, wherein subsequent to allocating the second plurality of buffers, said first buffer is at the head of the second list of buffers included in the allocation pool; and allocating the first buffer for a second log of the plurality of logs, wherein said second log is different from the first log, wherein said allocating the first buffer for the second log includes removing the first buffer from the allocation pool, adding the first buffer to a third list of buffers of the second log, and removing the first buffer from the first list of buffers for the first log.

In at least one embodiment, a distributed global memory may include a plurality of global memory portions of a plurality of computing modules, wherein the allocation pool of memory and the plurality of processing cores may be included in a same one of the plurality of computing modules, and wherein the allocation pool of memory may be included in a first global memory portion of the distributed global memory. The first global memory portion may be included in the same one computing module as the plurality of processing cores and wherein the first global memory portion may be configured to be accessed locally by the plurality of processing cores without using an internal switching fabric. The plurality of processing cores of the same one computing module may be configured to access other global memory portions of the distributed global memory, that are not included in the same one computing module, using the internal switching fabric. Each of the plurality of computing modules may include a different plurality of processing cores configured to locally access one of the plurality of global memory portions included in said each computing module without using the internal switching fabric. The different plurality of processing cores of said each computing module may be configured to access other global memory portions of the distributed global memory, that are not included in the said each computing module, using the internal switching fabric. Each of the plurality of global memory portions may be included in one of the plurality of computing modules, and wherein said one computing module may include a corresponding allocation pool of buffers used for logging messages of processing cores included in said one computing module.

In at least one embodiment, processing may include: receiving a request to aggregate a plurality of logs of at least two of the plurality of computing modules, wherein the plurality of logs includes a first set of logs and a second set of logs; obtaining the first set of logs from one global memory portion of the distributed global memory, wherein the one global memory portion is included in a first computing module of the plurality of computing modules; obtaining the second set of logs from a second global memory portion of the distributed global memory, wherein the second global memory portion is included in a second computing module of the plurality of computing modules;

and sorting records of the plurality of logs in accordance with a time associated with each of the records.

BRIEF DESCRIPTION OF THE DRAWINGS

Features and advantages of the present invention will become more apparent from the following detailed description of illustrative embodiments thereof taken in conjunction with the accompanying drawings in which:

FIG. 5 is a block diagram illustrating examples of trace buffers, according to embodiments of the techniques described herein;

FIG. 6 is a block diagram illustrating an example of a computing module trace table, according to embodiments of the techniques described herein;

FIG. 7A is a block diagram illustrating an example of master trace table, according to embodiments of the techniques described herein;

FIG. 7B is a block diagram illustrating a modified master trace table, according to embodiments of the techniques described herein;

FIGS. 8A-8J depict the state of various structures at different points in time in connection with an example illustrating use of the techniques herein;

DETAILED DESCRIPTION OF EMBODIMENTS

Figure 1:
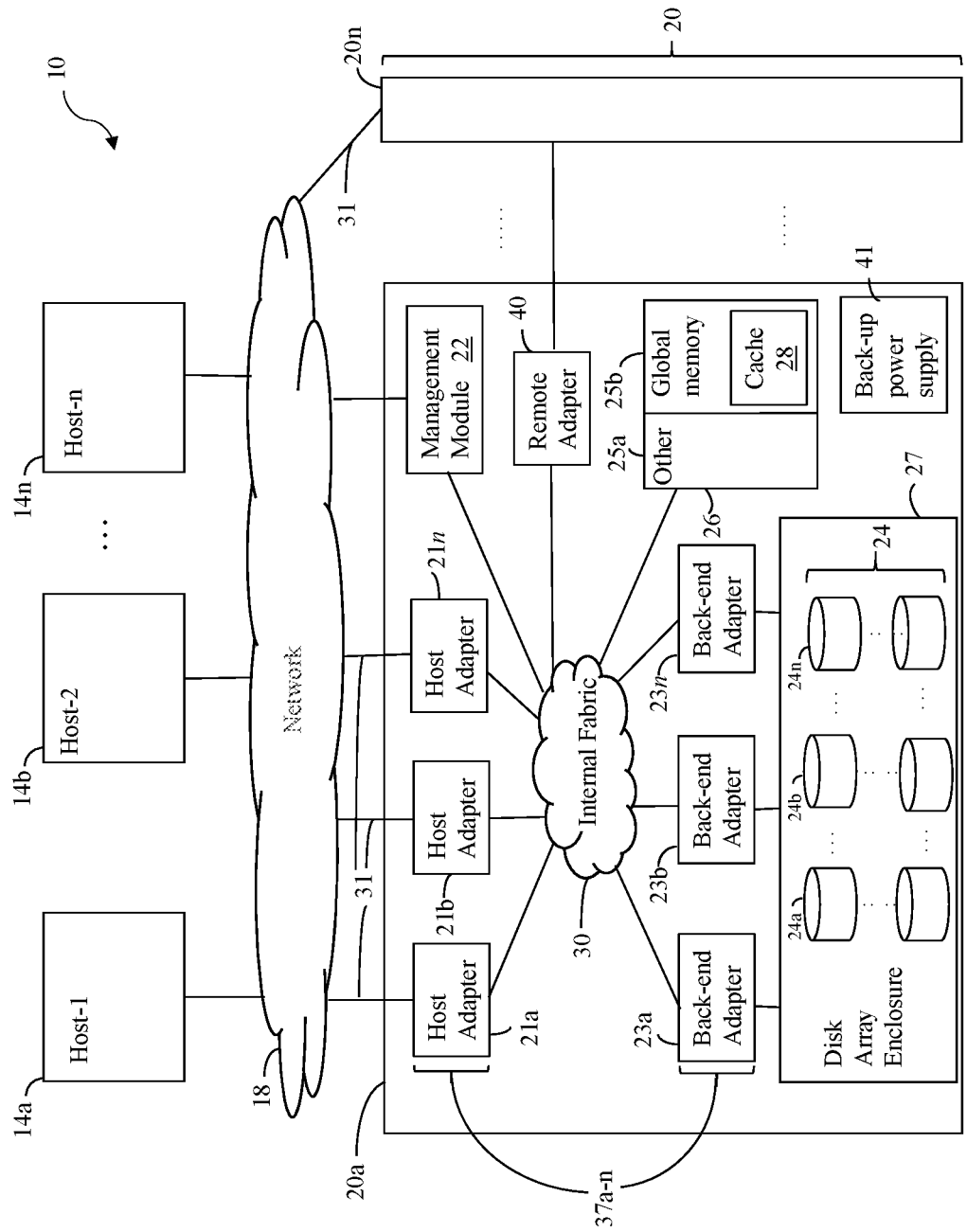
FIG. 1 is a block diagram illustrating an example of a data storage network, according to embodiments of the techniques described herein.

A storage system may have a plurality of physically discrete computing modules (hereinafter "computing modules") interconnected by an internal switching fabric of the storage system. For example, a computing module may be a director board of a PowerMax system made available from Dell EMC. Each computing module may have its own dedicated local memory and a global memory segment that is a portion of a distributed global memory shared by multiple (e.g., all) computing modules. Each computing module also may include one or more central processing units (CPUs), and, within each computing module, groups of two or more CPUs may be grouped into processing units referred to herein as processing cores. Each of these processing cores may be configured (e.g., hardwired, hardcoded or programmed) as a functional component of a storage system, for example, a front-end adapter (FA) or back-end adapter (BE) as described in more detail herein, or as some other functional component, for example, a data services component (DS) responsible for one or more data services, e.g., memory management for I/O operations. In some embodiments, a processing core may be configured to serve as a different functional component for different I/O operations.

A single I/O request (i.e., a SCSI command) received at the storage system from a host system may be collectively executed by multiple computing processing cores of the storage system. For example, a single I/O operation may result in several (e.g. tens or even more) sub-operations being performed on the storage system, and each of these sub-operations may be performed by a different processing core. Further, two or more of the multiple processing cores executing sub-operations of an I/O operation may be part of the same computing module, and two or more of the multiple processing cores executing sub-operations of an I/O operation may be part of separate computing modules.

It may be desirable to analyze the functionality (e.g., who is doing what and when) and/or performance (e.g., how well are they doing it) of a storage system or sub-components thereof. To this end, during execution of an I/O operation, various information may be recorded. For example, trace instructions may be written into the source code of the storage system. When executed, these trace instructions may store various information corresponding to the execution of a sub-operation and/or communications involving such sub-operations. This recorded information then may be analyzed to measure performance and/or determine functionality.

To perform such analysis, it may be necessary to use a centralized repository of the recorded trace information. If multiple processing cores across multiple computing modules are being used to execute I/O instructions, it may be desirable to record information at fine levels of temporal granularity (e.g., on the order of micro-seconds or even less) and/or physical granularity, e.g., at the level of processing cores. That is, it may be desirable to determine what is happening and when on each processing core throughout the execution of an I/O operation or a portion (e.g., one or more sub-operations) thereof. For better temporal accuracy in recording trace information for a processing core, it may be desirable to record the trace locally proximate (i.e., with high locality) to the processing core, e.g., in memory that is in the same computing module as the processing core. Further, as sub-operations of an I/O operation may be performed across multiple different computing modules, for a more thorough global assessment of performance, it may be desirable to store all of the trace information in a globally accessible location. Thus, it may be desirable to record the trace information with high locality and aggregate the information in a location that is globally accessible.

One solution to produce aggregated trace information from multiple computing modules is to have processing cores store trace information in global memory. However, global memory is not managed or controlled locally or dedicated to any one computing module. Thus, there is no guarantee that the instruction to store the trace information in global memory would result in the trace information being stored on a segment of global memory that is local to (i.e., on a same computing module as) the processing core that executes the trace instruction and posts the trace information to global memory. As a result, storing the trace information may result in storing trace information within a global memory segment on another computing module, which would require one or more communications being exchanged over the internal fabric of the storage system, costing time and system resources. Further, because global memory is shared among computing modules, multiple computing modules are contending for the same, centrally managed memory space, which may result in centralized locking of global memory portions resulting in further delays. Lastly, using global memory is more computationally expensive than using dedicated local memory because of the system resources involved in centralized management of the global memory.

Another potential solution to produce aggregated trace information from multiple computing modules is to have each processing core initially record trace information in the dedicated local memory of the computing module on which the processing core resides, and then copy needed trace information (e.g., in bulk) from each of the dedicated local memories of the computing modules to global memory. While this would save the computation cost of individually recording trace events to global memory, the copying to global memory would still involve the aforementioned shortcomings of global memory use.

What may be desirable is the ability to record and aggregate trace information from multiple computing modules of a storage system in a more computationally cost effective manner than known solutions.

Described herein are improved mechanisms and techniques for recordings and aggregating trace information from multiple computing modules of a storage system.

In some embodiments, on a storage system having multiple computing modules, where each computing module has multiple processing cores, processing cores record trace information for I/O operations in dedicated local memory— i.e., memory in the same computing module as the processing core that is dedicated to the computing module. One of the processing cores may be configured to aggregate trace information from across multiple computing modules into its dedicated local memory (i.e., the dedicated local memory of its computing module) by accessing trace information from the dedicated local memories of the other computing modules in addition to its own. The aggregated information in one dedicated local memory may be analyzed for functionality and/or performance and additional action taken based on the analysis, for example, as described in more detail elsewhere herein.

In some embodiments of the techniques described herein, one or more (e.g., all) of the processing cores of the computing modules may be configured to be able to access trace information in dedicated local memories of the other computing modules of the storage system, and different processing cores of different computing modules may be instructed at different times to access such trace information from dedicated local memories of other computing modules to implement embodiments of the techniques described herein.

While accessing information from dedicated local memories of other computing modules incurs the cost of communicating across the internal fabric of the storage system, it still may be computationally cheaper than using global memory. Further, it may be the case that there is no interest in analyzing the trace information of one or more computing modules in whatever analysis is performed, such that at least some communications across the internal fabric are avoided altogether. For example, a user may decide to analysis trace information only for a select few functional components (e.g. FAs and or BEs) implemented on processing cores within one or more first computing modules, but not to analysis trace information for one or more functional components implemented on processing cores within one or more second computing modules; in which case it is not necessary to access the trace information stored in the dedicated local memories of the one or more second computing modules.

The storage system (e.g., the processing cores of the storage system) may be configured (e.g., with software) to record any of a variety of trace information, including a time at which the trace information was recorded (i.e., the time at which the trace event (i.e., trace instruction) was executed). Each trace information record (e.g., entry of a data structure) may include any information that may be desirable to use in performance and/or functional analysis, and may include at least enough information to be able to uniquely identify the record and/or identify two records corresponding to a same sub-operation of an I/O operation. For example, a trace information record (also referred to herein as a "trace record") may include a unique identifier of an instance of a sub-operation and a time of execution of the sub-operation by the processing core. Each trace record also may include any of: an action associated with the processing core for the sub-operation (e.g., send, receive, execute); a functional component (e.g., FA, BE, DS) ID, a processing core ID, a host ID, a host port ID, one or more logical storage unit (LSU) IDs (e.g., storage group ID, LUN, thin device ID), a LSU location (e.g., logical track), a physical storage device ID, physical location (e.g., physical track) within physical storage device ID, cache slot ID, other metadata, a data payload, other information, or any suitable combination of the foregoing. What items of information to include in a trace record may be determined in consideration of a desired balance between the comprehensiveness of the trace information and memory consumption.

In some embodiments, each processing core of a computing module may have its own allotted portion of the dedicated local memory of its computing module in which to store trace information. For example, each processing core may have an allotted portion of dedicated local memory in which to implement a trace buffer including a plurality of trace records including trace information. Information associated with a trace record of a trace buffer of each processing core of a computing module may be aggregated into a single aggregated data structure of a computing module referred to herein as a computing module trace table or module trace table, for example, by one of the processing cores of the computing module. Each entry of the module trace table may correspond to an entry of a trace buffer of one of the processing cores.

In some embodiments, each record (i.e., entry) of a module trace table may include less information than the information included in the corresponding record in a trace buffer, and may include a pointer to the memory address of the corresponding entry. For example, in some embodiments, each module trace table record includes only: a minimum amount of information to uniquely identify the record from other module trace table entries, and to identify a specific sub-operation; a time the sub-operation executed; and a memory location of the corresponding record of the trace buffer. In some embodiments, the information included in each module trace table entry may be based on information provided by a user or other entity, which may be used to filter information from trace buffer records to populate module trace table records.

In some embodiments, the records of the module trace table may be sorted (e.g., by a processing core of the computing module), for example, based on the time value of the record indicating the time at which the represented sub-operation was executed.

In some embodiments, a processing core of one of the computing modules may aggregate records of multiple module trace tables into a single master trace table on the computing module of the processing core. The records of the master trace table may be sorted, for example, based on the time value of the record indicating the time at which the represented sub-operation was executed.

In some embodiments, the master trace table records may be analyzed to determine whether any two records constitute a pair of records for a same sub-operation, e.g., a first record of the pair representing a sending of first sub-operation from a sending processing core of one of the plurality of computing units and a second record of the pair representing a receiving of the first sub-operation at a receiving processing core of the plurality of processing cores. If a pair is determined, it may be determined whether the time specified by the record representing the receiving of the sub-operation is less than the time specified by the record representing the sending of the sub-operation, and if so, by how much time. Such a determination would indicate the clocks of the corresponding computing modules are skewed, even though a universal clock (e.g., in accordance with a network time protocol (NTP)) may have been employed. In response to this determination, any entries in the master record for the computing module (or at least the processing core) of the record representing the sending of the sub-operation, which indicate a time prior to such record (i.e., listed earlier in the master trace table if already sorted) may be decremented by at least an amount of the skew. Alternatively in response to this determination, any entries in the master record for the computing module (or at least the processing core) of the record representing the receiving of the sub-operation, which indicate a time after such record (i.e., listed later in the master trace table if already sorted) may be incremented by at least an amount of the skew. However, decrementing the records of the other computing module (or processing core thereof) as described above may be preferred to avoid having to adjust the entries corresponding to the computing module (or processing core thereof) of the receiving record again if additional future records are analyzed with respect to such records.

The records of the master trace table may be analyzed (e.g., manually on a GUI by a human) or automatically (e.g., in accordance with predefined logic) to determine if it is desirable to further investigate any particular one or more sub-operations in greater detail, for example, if the analysis reveals a potential performance issue. If it is so desirable, a programmable or user-specifiable amount of information from one or more records of one or more trace buffers on one or more computing modules may be accessed. For example, a timeframe and/or one or more other filters specifying any information recorded in trace buffers may be specified (e.g., by a user) and the time values and address pointers in the master trace table records may be used to identify the memory address of, and retrieve and filter information from, the trace buffer records in dedicated local memory of one or more computing modules. The filtered information may be further analyzed and further iterations of specifying, retrieving, filtering and analyzing trace information performed.

In some embodiments of the techniques described herein, trace instructions may be programmed into software that runs on the storage system, such trace instructions specifying when (by their logical position in the code) to record trace information and what information to record. In some cases, a user (e.g., storage administrator) may desire to include additional information to be recorded for one or more trace instructions, but realized this desire after the software has already been compiled. In some embodiments, the software may be configured to allow modification (or at least addition) of trace information to be recorded after compile time. For example, the software may be configured to call out to a predefined file or other software construct to determine what information to record. The software may be further configured to provide a user interface (e.g., GUI or command line interface) the enables a user to modify the information.

Illustrative embodiments of the techniques described herein will now be described in more detail in relation to the figures.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the techniques described herein are in reference to storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (I/O) operations or data requests, through network 18. For example, each of hosts 14a-n may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMf); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and interconnected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all I/O communications with one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more host adapters ("HAs") 21a-n, which also are referred to herein as front-end adapters ("FAs") (e.g., directors configured to serve as FAs). Each of these FAs may be used to manage communications and data operations between one or more host systems and GM 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

Storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to storage system 20a via network 18.

The FAs, BEs and RA may be collectively referred to herein as directors 37a-n. Each director 37a-n may include a processing core including compute resources, for example, one or more CPUs cores and/or a CPU complex for processing I/O operations, and may be implemented on a circuit board, as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (IB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the techniques described herein are not so limited. In some embodiments, memory 26, or the GM 25b or other memory 25a thereof, may be distributed among a plurality of circuit boards (i.e., "boards"), as described in more detail elsewhere herein.

In at least one embodiment, write data received at the storage system from a host or other client may be initially written to cache 28 and marked as write pending. For example, cache 28 may be partitioned into one or more portions called cache slots, which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more physical storage devices 24a-n, such as by a BE.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Storage system 20a may include a back-up power supply 41 (e.g., a battery) that can provide power to the storage system for a limited amount of time to after primary (AC) power fails. This limited time may allow certain tasks to be performed during a window time beginning when the primary power fails until the earliest of: the primary power is restored; and the end of the limited lifetime (sometimes on the order of second or tens of seconds) of the back-up power supply. For example, during this window of time, the contents of the cache 28 may be de-staged to one or more physical storage devices.

Figure 2:
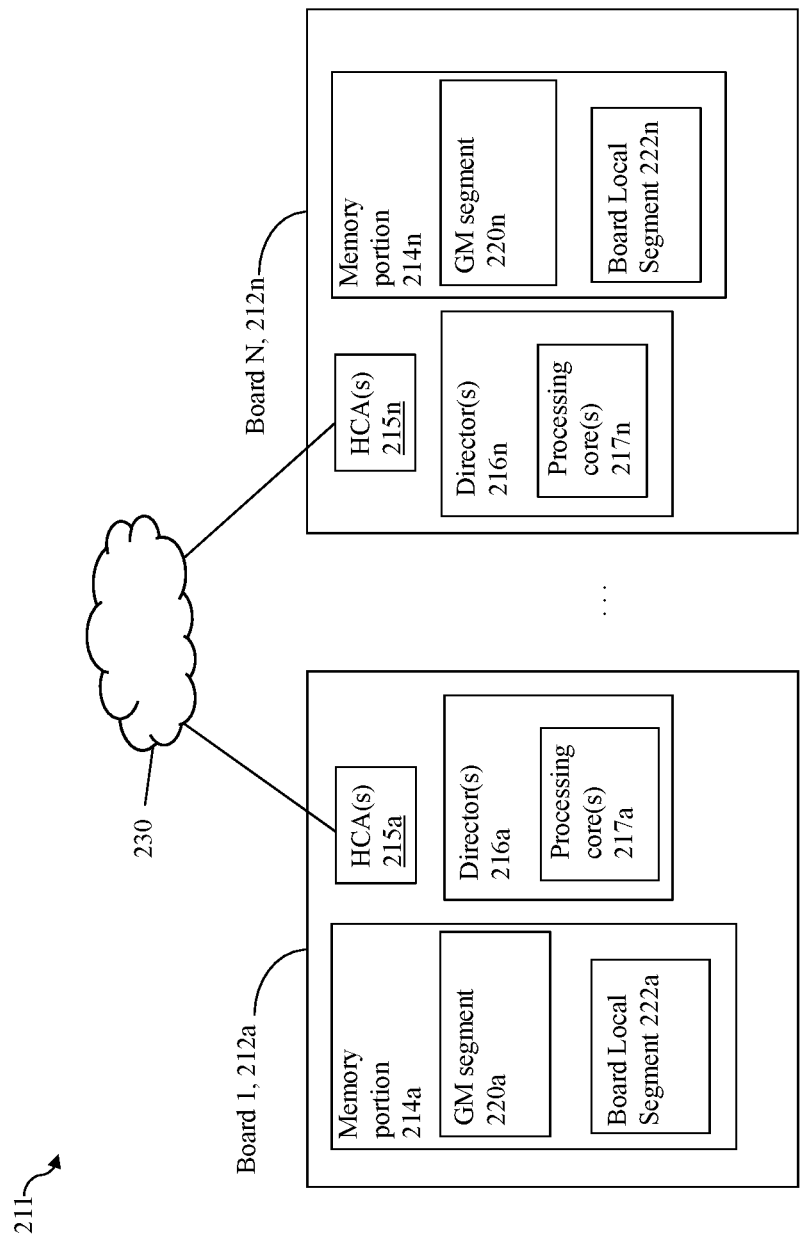
FIG. 2 is a block diagram illustrating an example of a storage system including multiple circuit boards, according to embodiments of the techniques described herein.

Any of storage systems 20a-n, or one or more components thereof, described in relation to FIGS. 1-2 may be implemented using one or more Symmetrix®, VMAX®, VMAX3® or PowerMax™ systems made available from Dell EMC (elsewhere referred to herein collectively as PowerMax Systems).

Host systems 14a-n may provide data and control (e.g., management and access control) information to storage systems 20a-n over a plurality of I/O paths defined between the host systems and storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly, but rather access to data may be provided to one or more host systems from what the host systems view as a plurality of logical storage units (LSUs) including, for example, a logical volume, logical block, LUN (i.e., logical device or logical disk), thin device, groups of logical devices (e.g., storage group), NVMe namespace, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

FIG. 2 is a block diagram illustrating an example of at least a portion 211 of a storage system (e.g., 20a) including multiple boards 212a-212n. Storage system 211 may include a plurality of boards 212a-212n and a fabric 230 (e.g., internal fabric 30) over which the boards 212a-n may communicate. Each of the boards 212a-212n may include components thereon as illustrated. The fabric 230 may include, for example, one or more switches and connections between the switch(es) and boards 212a-212n. In at least one embodiment, the fabric 230 may be an IB fabric.

In the following paragraphs, further details are described with reference to board 212a but each of the N boards in a system may be similarly configured. For example, board 212a may include one or more directors 216a (e.g., directors 37a-n) and memory portion 214a. The one or more directors 216a may include one or more processing cores 217a including compute resources, for example, one or more CPUs cores and/or a CPU complex for processing I/O operations, and be configured to function as one of the directors 37a-n described herein. For example, element 216a of board 212a may be configured to operate, such as by executing code, as any one or more of an FA, BE, RA, and the like.

Each of the boards 212a-n may include one or more host channel adapters (HCAs) 215a-n, respectively, that physically couple, and are configured to enable communication between, the boards 212a-n, respectively, and the fabric 230. In some embodiments, the fabric 230 may include multiple (e.g., 2) switches, and each HCA 215a-n may have multiple (e.g., 2) ports, each one connected directly to one of the switches.

Each of the boards 212a-n may, respectively, also include memory portions 214a-n. The memory portion of each board may be characterized as locally accessible with respect to that particular board and with respect to other components on the same board. For example, board 212a includes memory portion 214a which is memory that is local to that particular board 212a. Data stored in memory portion 214a may be directly accessed by a CPU or core of a director 216a of board 212a. For example, memory portion 214a may be a fast memory (e.g., DIMM (dual inline memory module) DRAM (dynamic random access memory)) that is locally accessible by a director 216a where data from one location in 214a may be copied to another location in 214a directly using DMA operations (e.g., local memory copy operations)

issued by director 216a. Thus, the director 216a may directly access data of 214a locally without communicating over the fabric 230.

The memory portions 214a-214n of boards 212a-n may be further partitioned into different portions or segments for different uses. For example, each of the memory portions 214a-214n may respectively include GM segments 220a-n configured for collective use as segments of a distributed GM. Thus, data stored in any GM segment 220a-n may be accessed by any director 216a-n on any board 212a-n. Additionally, each of the memory portions 214a-n may respectively include board local segments 222a-n. Each of the board local segments 222a-n are respectively configured for use locally by the one or more directors 216a-n, and possibly other components, residing on the same single board. In at least one embodiment where there is a single director denoted by 216a (and generally by each of 216a-n), data stored in the board local segment 222a may be accessed by the respective single director 216a located on the same board 212a. However, the remaining directors located on other ones of the N boards may not access data stored in the board local segment 222a.

To further illustrate, GM segment 220a may include information such as user data stored in the data cache, metadata, and the like, that is accessed (e.g., for read and/or write) generally by any director of any of the boards 212a-n. Thus, for example, any director 216a-n of any of the boards 212a-n may communicate over the fabric 230 to access data in GM segment 220a. In a similar manner, any director 216a-n of any of the boards 212a-n may generally communicate over fabric 230 to access any GM segment 220a-n comprising the GM. Although a particular GM segment, such as 220a, may be locally accessible to directors on one particular board, such as 212a, any director of any of the boards 212a-n may generally access the GM segment 220a. Additionally, the director 216a may also use the fabric 230 for data transfers to and/or from GM segment 220a even though 220a is locally accessible to director 216a (without having to use the fabric 230).

Also, to further illustrate, board local segment 222a may be a segment of the memory portion 214a on board 212a configured for board-local use solely by components on the single/same board 212a. For example, board local segment 222a may include data described in following paragraphs which is used and accessed only by directors 216a included on the same board 212a as the board local segment 222a. In at least one embodiment in accordance with techniques herein and as described elsewhere herein, each of the board local segments 222a-n may include a local page table or page directory used, respectively, by only director(s) 216a-n local to each of the boards 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the data cache, various metadata and/or structures, and other information, as described in more detail elsewhere herein. Consistent with discussion herein, the data cache, having cache slots allocated from GM segments 220a-n, may be used to store I/O data (e.g., for servicing read and write operations).

Figure 3:
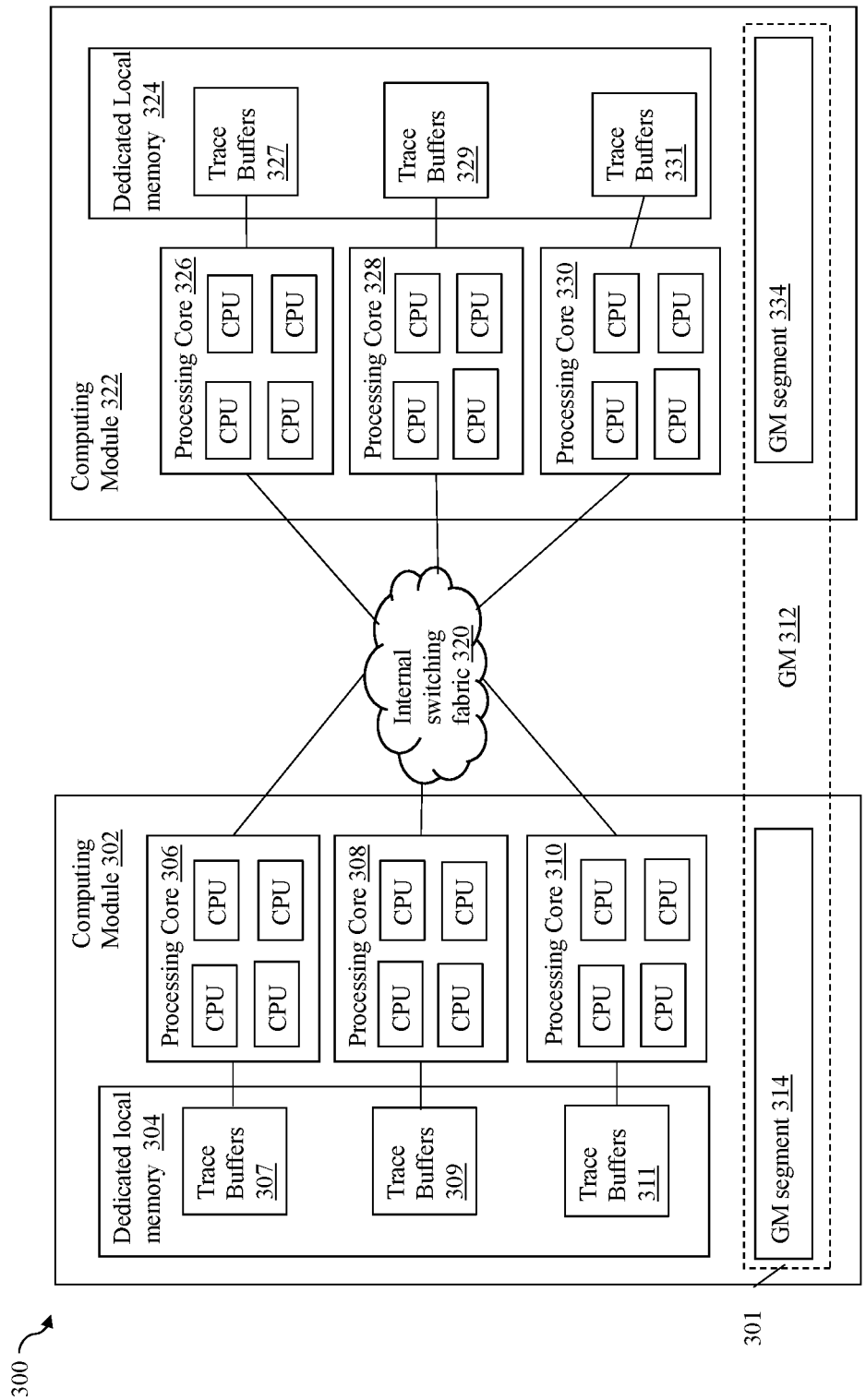
FIG. 3 is a block diagram illustrating an example of a storage system including multiple computing modules and processing cores, according to embodiments of the techniques described herein.

FIG. 3 is a block diagram illustrating an example of a storage system 300 including multiple computing modules and processing cores, according to embodiments of the techniques described herein. Other embodiments of a storage system including multiple computing modules and processing cores, for example, variations of the storage system 300, are possible and are intended to fall within the scope of the techniques described herein. The storage system 300 may be a variation of the storage system 211 and may include any of the functionality and/or component described above in relation to storage systems 211 and/or 20a.

The storage system 300 may include multiple computing modules, including computing modules 302 and 322. It should be appreciated that the storage system may include more than two computing modules. Each of computing modules 302 and 322 may be a director board of a Power-Max system made available from Dell EMC. Computing module 302 may include a plurality of processing cores, including processing cores 326, 328 and 330. Each processing core may include a plurality of CPUs, including a number other than four as illustrated in FIG. 3. Each of the processing cores 326, 328 and 330 cores may be configured (e.g., hardwired, hardcoded or programmed) as a functional component of a storage system, for example, an FA, BE or DS. It should be appreciated that the computing module 302 may include more than three processing cores.

The computing module 302 also may include a dedicated local memory 304 dedicated to the computing module, which may be an implementation of the board local segment 222a described in relation to storage system 211. Each of the processing cores 306, 308 and 310 may be allocated a portion of the dedicated local memory in which to implement a trace buffer, for example, trace buffers 307, 309 and 311, respectively. Each of the trace buffers 307, 309 and 311 may be implemented as described in more detail elsewhere herein. The computing module 302 may include a GM segment 314, which may be an implementation of the board local segment 222a described in relation to the storage system 211. The GM segment 314 may be a shared portion of a distributed GM 312. Distributed GM 312 may include a GM segment 334 of a computing module 322. The computing module 322 may be connected to the computing module 302 by an internal fabric 320, and may include any of: processing cores 326, 328 and 330, dedicated local memory 324 including trace buffers 327, 329 and 331 and GM segment 334, each of which may have the same or similar features as the features described for components of the same name of the computing module 302.

The storage system 300 may be used to implement one or more embodiments of the techniques described herein, including a method of collecting and analyzing trace information, for example, a method 400 which will now be described in relation to FIG. 4.

Figure 4:
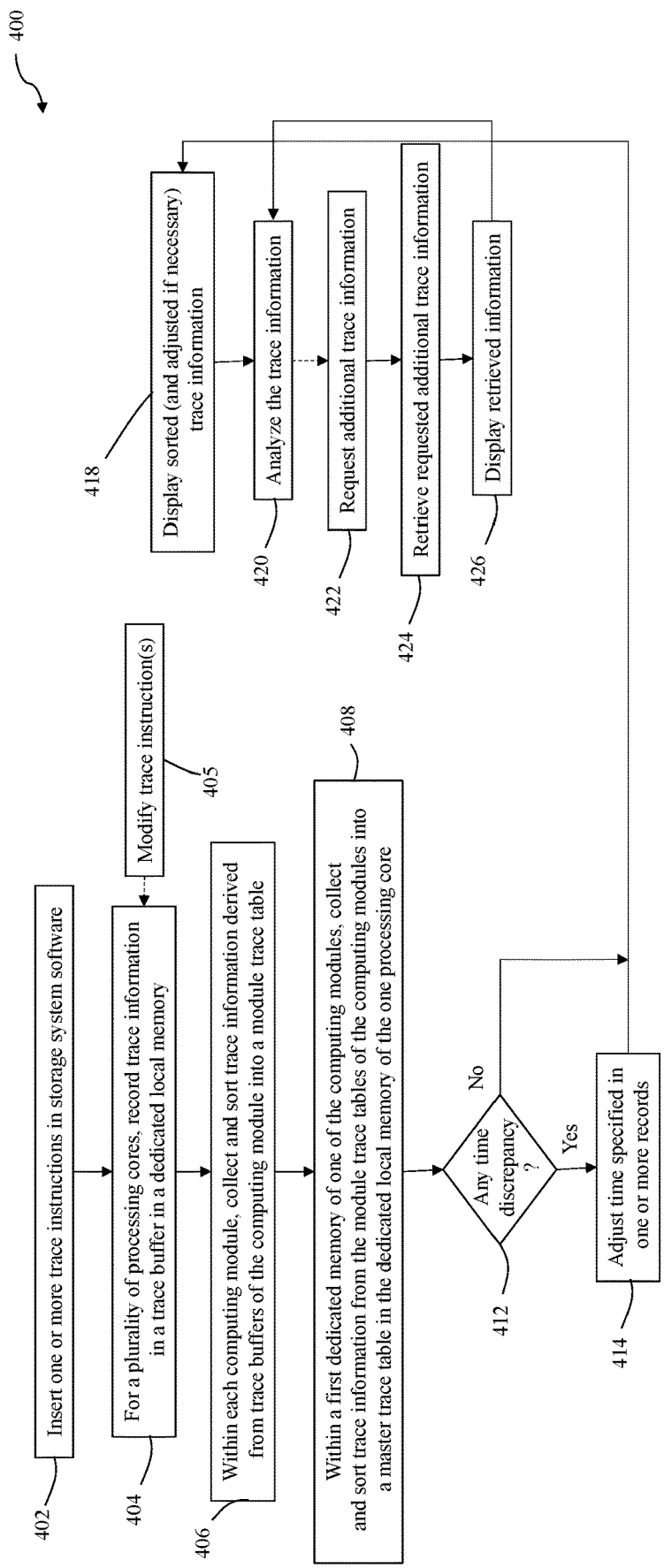
FIG. 4 is a flowchart illustrating an example of a method of collecting and analyzing trace information for I/O operations executing on a multi-computing module storage system, according to embodiments of the techniques described herein.

FIG. 4 is a flowchart illustrating the method 400 of collecting and analyzing trace information for I/O operations executing on a multi-computing module storage system, according to embodiments of the techniques described herein. Other embodiments of a method of collecting and analyzing trace information for I/O operations executing on a multi-computing module storage system, for example, variations of the method 400, are possible and are intended to fall within the scope of the techniques described herein.

In a step 402, one or more trace instructions may be inserted into software that executes on a storage system. For example, a software engineer may program source code of the storage system to include one or more trace instructions, for example, at locations within the code at which I/O operations are being executed. Execution of each instructions may cause information about the state of one or more variables, which may be selected by the programmer, and may be referred to herein as trace information, to be recorded as is described in more detail herein. The recorded trace information may include any of a variety of I/O-related information, including any of the I/O-related information described herein.

In a step 404, for a plurality of processing cores, trace information may be recorded in a trace buffer in a dedicated local memory for a processing core, for example, in any of trace buffers 500, 520 and 540 describe in relation to FIG. 5.

FIG. 5 is a block diagram illustrating examples of trace buffers 500, 520 and 540, according to embodiments of the techniques described herein. Other examples of trace buffers, for example, variations of trace buffers 500, 520 or 540 are possible and are intended to fall within the scope of the techniques described herein. The examples illustrated in FIG. 5 may reflect recording entries in multiple trace buffers of different computing modules for an I/O operation, for example, a read operation, according to embodiments of the techniques described herein.

A trace buffer 500 may include a plurality of records (i.e., entries) 502a-e, where each record corresponds to a sub-operation for which a trace instruction was executed by a particular process core of computing engine. Each record 502a-e may specify a value for each of time column 504, trace ID column 506, sub-operation description column 508, action column 512, computing module ID column 514, core ID column 516 and one or more other information columns 518. A value of a timestamp generated on the computing module for the time of execution of the sub-operation corresponding to a record may be specified in the time column 504. A unique identifier of the instance of the executed sub-operation corresponding to the record may be specified in the trace ID column 506. A description of the executed sub-operation corresponding to the record may be specified in the description column 508. The action performed (e.g., the role played) by the processing core in connection with the sub-operation corresponding to the entry may be specified in the action column. For example, a processing core may perform the action of sending a communication to perform the sub-operation, receive a communication to perform the action or may perform the action of executing the sub-operation. An ID of the computing module and an ID of the processing module corresponding to the sub-operation, i.e., the processing module and computing module that populated the record and to which the trace buffer 500 belongs, may be specified in computing module ID column 514 and processing core ID column 517, respectively. Any of a variety of other information related to the sub-operation corresponding to the record, e.g., any such information described herein, may be specified in one or more other information columns 518.

Trace Buffers 520 and 540 may be trace buffers for other processing cores, and may include entries 522a-c and 542a-c, corresponding to sub-operations executed by the processing cores to which trace buffers 520 and 540, respectively, are allocated, and which respective processing cores populated trace buffers 520 and 540. Each of records 522a-c and 542a-c may specify values for the same columns 504, 506, 508, 512, 514, 516 and 518 describe above in relation to the trace buffer table 500, but for the sub-operations corresponding to their respective processing cores.

Returning to the method 400, in a step 406, within each computing module, trace information derived from trace buffers of the computing module may be collected and sorted (e.g., according to time) in a module trace table for the computing module. For example, one or more pieces of information may be copied from trace records of one or more trace buffers of the computing module into the module trace table of the computing module, and, for each trace buffer record, a pointer specifying a memory address of the record within the dedicated local memory of the computing module may be recorded in the corresponding record in the module trace table.

For example, FIG. 6 is a block diagram illustrating an example of a computing module trace table 600, according to embodiments of the techniques described herein. Other examples of a computing module trace table, for example, variations of the computing module trace table 600 are possible and are intended to fall within the scope of the techniques described herein.

The module trace table 600 may correspond to a computing module A, and may be derived from the trace buffer 500, which may correspond to a processing core 1 of the computing module A, and from the trace buffer 520, which may correspond to a processing core 3 of the computing module A. For example, the trace table 600 may include trace records 602a-602d and 602h corresponding to records 502a-e of the trace buffer 502, and include trace records 602e-g corresponding to records 522a-c of the trace buffer 522. The module trace buffer 600 may include columns 604, 606, 608, 612, 614 and 616 corresponding to columns 504, 506, 508, 512, 514 and 516 of trace buffers 502, 522 and 524. However, rather than having one or more other information columns, the module trace buffer may have a pointer column 618 for providing a pointer specifying a memory address of the trace buffer record corresponding to the module trace table record. As illustrated by module table 600, records 602a-602h may be sorted by the time values specified in the time column 604 of each record.

The module trace table 600 may be configured so that each record includes less or more information than is depicted in FIG. 6. In some embodiments, the module trace table 600 may be configured so that each record includes only: a minimum amount of information to uniquely identify the record from other module trace table entries, and to identify a specific sub-operation; a time of execution of the sub-operation; and a memory location of the corresponding record of the trace buffer.

In some embodiments, the information included in each record of the module trace table 600 may be based on information provided by a user or other entity, which may be used to filter information from trace buffer records of the trace buffers 502 and 522 to populate the module trace table records 622a-h.

Returning to the method 400, in a step 408, within a first dedicated memory of one of the computing modules, trace information from the module trace tables of the computing modules may be collected and sorted into a master trace table in the dedicated local memory of the one processing core. The records of the master trace table may be sorted, for example, based on the time value in each record indicating the time at which the represented sub-operation was executed.

The step 408 may include collecting trace information only from select computing modules; i.e., from less than all of the computing modules. For example, a user may select to perform analysis on certain functional components (e.g., FAs, BEs and/or DSs) only. Accordingly, trace information may be collected only from the computing module(s) having processing cores that implement the selected functional components. Similarly, a user may select specific processing cores themselves, and trace information may be collected only from the computing module(s) having the selected processing cores. Thus, the method 400 may include a step (not shown) prior to the step 408 of receiving a user input (e.g., from a GUI or command line interface) to select information from a certain timeframe for specified functional components and/or processing cores only. Only retrieving trace information for select functional components and/or processing cores may reduce (perhaps significantly) an amount of trace information that is exchanged over internal fabric between the computing module of the collecting processing core and the computing modules of other computing modules.

FIG. 7A is a block diagram illustrating an example of a master trace table 700, according to embodiments of the techniques described herein. Other examples of a master trace table, for example, variations of the master trace table 700 are possible and are intended to fall within the scope of the techniques described herein.

The master trace table 700 may be derived from the module trace buffer 600, and a module trace buffer (not shown) corresponding to a computing module B, which may have been derived from the trace buffer 540 corresponding to a processing core 2 of the computing module. For illustrative purposes, it will be assumed that the processing core 2 is the only processing core of the computing module B that recorded any entries for the time frame for which records were collected. It should be appreciated that in actual practice, trace records in module trace tables may be derived from trace records of several trace buffers corresponding to several processing cores. Further, while each of trace buffers 502, 522 and 542, module trace buffer 600 and master trace buffer show less than twenty records, it should be appreciated that each of these data structures may hold hundreds, thousands, millions or even tens of millions of records. For example, a storage system may execute a million or more I/O operations per second, and each of these I/O operations may include execution of tens of sub-operations, so trace buffers may fill-up fast. In some embodiments, after a trace buffer reaches capacity, the trace buffer may be purged and re-populated anew starting with a next trace instruction. Alternatively, a trace buffer may be a circular buffer in which, once full, oldest records are purged and replaced with records for most recently executed trace instructions.

The master trace table 700 may include columns 704, 706, 708, 712, 714, 716 and 718 corresponding to columns 604, 606, 608, 612, 614, 616 and 618 of the one or more module trace tables 600 from which the records in master trace table 700 are gathered. The master table 700 includes a plurality of records 702a-k sorted by the value specified in the time column 704 of each respective column.

Returning to the method 400, in a step 412 it may be determined whether there is any time discrepancy among the records of the master trace table. For example, the master trace table records may be analyzed to determine whether any two records constitute a pair of records for a same sub-operation, e.g., a first record of the pair representing a sending of first sub-operation from a sending processing core of one of the plurality of computing units and a second record of the pair representing a receiving of the first sub-operation at a receiving processing core of the plurality of processing cores. If a pair is determined, it may be determined whether the time specified by the record representing the receiving of the sub-operation is less than the time specified by the record representing the sending of the sub-operation, and if so, by how much time. In other words, are the pair of records indicating a nonsensical sequence in which a sub-operation communications is received at a processing core of a computing module before it is sent from a processing core of another computing module. Such a determination would indicate the clock of each corresponding computing module is skewed, even though a universal clock (e.g., in accordance with a network time protocol (NTP)) may have been employed.

In response to such a determination, a time specified in one or more records may be adjusted in a step 414. For example, any entries in the master record for the computing module (or at least the processing core) of the record representing the sending of the sub-operation, which indicate a time prior to such record (i.e., listed earlier in the master trace table if already sorted—or alternatively any records of such computing module for consistency—may be decremented by at least an amount of the skew. Alternatively in response to this determination, any entries in the master record for the computing module (or at least the processing core) of the record representing the receiving of the sub-operation, which indicate a time after such record (i.e., listed later in the master trace table if already sorted) may be incremented by at least an amount of the skew. However, decrementing the records of the other computing module (or processing core thereof) as described above may be preferred to avoid having to adjust the entries corresponding to the computing module (or processing core thereof) of the receiving record again if additional future records are analyzed with respect to such records.

For example, referring again to the master trace table 700, it may be determined from values in trace ID column 706 that records 702a and 702e (trace ID=61) are a pair of records for the sub-operation of locking a cache slot for an I/O operation. However, the record 702a indicates that a communication to perform the lock was received by the processing core 2 of the computing module B at time 3146, before such communication was sent by processing core 1 of computing module A at 3244 as indicated by the record 702e.

As a result, the time discrepancy may be reconciled; for example, the time value for each respective record for the computing module A may be decremented by 100 and the records of the master table 700 re-sorted to produce the modified master table 700' of FIG. 7B. FIG. 7B is a block diagram illustrating a master trace table 700' modified as a result of a determination of a discrepancy between time values of records, according to embodiments of the techniques described herein. Other examples of a modified master trace table, for example, variations of the modified master trace table 700' are possible and are intended to fall within the scope of the techniques described herein.

As illustrated by modified master trace table 700', time values of records 702d-h of the master trace table 700 were decremented by 100 to produce modified records 702d'-h' of modified master trace table 700', which as illustrated in FIG. 7B have been resorted along with records 700a-c according to the adjusted time values.

Returning to the method 400, in a step 418, the sorted (and adjusted if necessary) entries of the master trace table may be displayed to a user, for example, as part of a GUI. The trace information of the master trace table may be analyzed in a step 420, manually by a human and/or or automatically based on predefined logic, to determine if it is desirable to further investigate any particular one or more sub-operations in greater detail, for example, if the analysis reveals a potential performance issue. If it is so desirable, additional trace information may be requested in a step 422 and retrieved in a step 424. For example, a programmable or user-specifiable amount of information from one or more records of one or more trace buffers on one or more computing modules may be accessed. For example, a timeframe and/or one or more other filters specifying any information recorded in trace buffers may be specified (e.g., by a user using the GUI) and the time values and address pointers in the master trace table records may be used to identify the memory address of, and retrieve and filter information from, the trace buffer records in dedicated local memory of one or more computing modules. The retrieved information may be displayed in a step 426 and analyzed in a next iteration of the step 402. Further iterations of specifying, retrieving, filtering and analyzing trace information may be performed.

As noted elsewhere herein, in the step 402, trace instructions may be programmed into software that runs on the storage system, such trace instructions specifying when (by their logical position in the code) to record trace information and what information to record. In some cases, a user (e.g., storage administrator) may desire to include additional information to be recorded for one or more trace instructions, but does not realize the desire until after the software has already been compiled. In some embodiments, the software may be configured to allow modification (or at least addition) of trace information after compile time. For example, the software may be configured to call out to a predefined file or other software construct to determine what information to record. The software may be further configured to provide a user interface (e.g., GUI or command line interface) the enables a user to modify the information in the software construct; i.e., to modify one or more trace instructions, in a step 405.

It should be appreciated that while steps of the method 400 are illustrated in FIG. 4 as being performed serially, and in a certain order, one or more these steps or portions thereof may be performed concurrently and/or in a different order than illustrated in FIG. 4. For example, trace information may continue to be recorded in the step 404, while information is collected, sorted and aggregated in the steps 406 and 408.

Described above are techniques that may be used to record and aggregate trace messages from multiple processing cores on one or more computing modules into a time ordered list. In this manner, the time ordered list, also referred to as a master trace table (e.g., FIGS. 7A, 7B), may provide a global system wide time ordered view of trace messages across all directors or processing cores in the system. The trace records recorded for each of the directors or processing cores may also be referred to more generally as a log or log file in which the trace messages are stored in memory.

The rate of logging or recording the trace messages may vary from one processing core to another. Also, the rate at which messages are recorded or logged in each log by a single processing core or director may vary dynamically over time. When merging or combining the logs of the different processing cores, the rate at which messages are logged in each log by the processing cores affects the total relevant duration time of the resulting aggregated logs. The relevant duration time with respect to the aggregated buffered or logged messages may be defined as the time span that the logged or recorded trace messages of the different logs overlap. This overlap in time with respect to logged messages of the different logs is desirable so as to denote recorded events occurring within the same time period across multiple components of the system. Aggregated log information for the same time span for multiple components may be used for any suitable purpose. For example, the aggregated log information may be viewed and analyzed for any suitable purpose, such as trouble shooting and monitoring the health of the system. Thus, it may be desirable to maximize this overlapping time span of the different logs.

In connection with the varying and changing logging rates of the processing cores of the multiple computing modules, for a same size buffer or log including trace messages, the higher the logging rate of the processing core, the smaller the time span denoting by the messages recorded in the buffer. In contrast, the lower the logging rate of the processing core, the larger the time span denoted by the messages recorded in the buffer.

Due to the varying and changing logging rates of the processing cores over time, it may be difficult to efficiently manage the memory used for the buffers of recorded messages. For example, one approach may allocate an equal amount of buffer or memory to each processing core for storing messages. However, if the processing cores have varying logging rates, this may lead to an undesirable reduced overlap in the time spans of the different logs when aggregating the logs.

Described in following paragraphs are improved techniques for managing the buffers of the processing cores or directors that take into account the possible differences in logging rates, and thus take into account the amount of buffer space consumed by the different directors in logging the trace messages at different points in time. The techniques provide for maximizing the overlapping time span associated with recorded trace messages of each processing core to provide for an improved global aggregated view of the trace messages of the processing cores. The techniques provide for increasing the relevant overlapping, common time span or duration of the resulting combined logs across all processing cores. In at least one embodiment, processing may be performed to analyze the activity and trace messages across all processing cores for the same time period using the aggregated combined logs presented in a time dependent ordering of the recorded messages. The techniques herein provide for increasing the time period of overlapping available trace messages recorded in the logs of the processing cores.

In at least one embodiment, the techniques combine the storage or memory of the local buffers of all processing cores of the same computing module into a common buffer pool shared by the processing cores. The techniques take into account the different and changing logging rates of the processing cores and provide for partitioning the pool of buffer space or memory among the different processing cores based on the logging rate of the processing cores. Furthermore, the techniques provide for management of the buffer or memory of the pool that dynamically adapts to changes in the logging rates, and thus buffer consumption rates, of the processing cores over time. Additional buffers from the allocation pool are allocated to each processing core for storing its logged messages as needed. The foregoing and other aspects of the techniques herein are described in more detail in following paragraphs.

The techniques described in following paragraphs may be used in connection with logging trace messages. More generally, the techniques described in following paragraphs may be used in connection with allocating memory buffers among multiple consumers, such as processes or processing cores, where the memory buffers may be used for logging trace messages or any other suitable application.

The techniques in following paragraphs provide for efficient memory use by recycling or reusing the memory used for logging among the different logs of the different processing cores based on the logging rates of the processing cores.

In at least one embodiment, the available memory used for logging trace messages in multiple logs for multiple processing cores in the same computing module may be partitioned into multiple equal size buffers. In at least one embodiment, the number of the buffers may be at least twice the number of logs. Each log may initially receive one buffer with the remainder of the buffers stored in an allocation pool. The initially allocated buffer may be used as an active or current buffer into which the processing core is recording or logging messages. The allocation pool may be a queue or list from which additional buffers may be allocated for the different logs of the different processing cores on demand as needed. Thus, an additional buffer may be allocated for a log when the current active buffer is filled or consumed by the processing core for logging messages.

A list of queue of buffers may also be maintained for each log. The list of buffers for a log may order the buffers in the list in accordance with the time order in which the buffers are allocated for the log. When one log fills its active buffer, it will request and receive a new buffer which will be the buffer at the head of the list of buffers of the allocation pool. The log may also append its full buffer to the end or tail of the list of buffers of the allocation pool. Now the previously active, full buffer belongs to both the log and the allocation pool, until the full buffer subsequently becomes the head buffer in the allocation pool and is allocated to a different log.

The buffers in the allocation pool may be arranged by their time relevancy with the first or head buffer of the list storing the oldest and least recently used data, and where the last or tail buffer of the list storing the newest and most recently used data. Thus, in at least one embodiment, the allocation pool may be maintained as a list or queue of buffers in which filled or consumed buffers are added to the allocation pool at the end or tail of the buffer list. The list of buffers, as filled, are maintained in order based on usage with the head of the list (from which buffers are allocated) denoting the least recently used and filled buffer, and the tail of the list (to which filled or consumed buffers are added) denoting the most recently used and filled buffer.

In accordance with the techniques herein, by allocated the buffer at the head of the list of the allocation pool, the less relevant, oldest and least recently used data is overwritten prior to other existing data of other buffers in the allocation pool. The processing cores performing more active logging with a higher logging rate request new buffers more frequently than other less active processing cores.

In accordance the techniques herein, each log owns or includes at least one buffer at any given time. In at least one embodiment, a new buffer may not be requested until the single current active buffer of the log is full or almost full. In at least one embodiment, a processing core may have only a single active or current buffer to which log messages are written. The processing core may request the new buffer responsive to determining that the active or current buffer is full or otherwise has less than a minimum threshold amount of buffer space remaining. Thus the processing core may request one additional buffer at a time, on demand, as the current or active buffer is consumed.

What will now be described is an example illustrating use of the techniques herein. For simplification of illustration, the following example includes only 2 processes or processing cores C1 and C2 and only includes 100 buffers. More generally, any suitable number of processes or processing cores and any suitable number of buffers may be used. In the following example, the processing cores C1 and C2 may be included in the same computing module and the allocation pool may be included in a portion of the distributed GM that is local to C1 and C2. For example, with reference back to FIG. 3, the allocation pool may be included GM segment 314.

Referring to FIG. 8A, shown is an example 1000 illustrating the state of the allocation pool and logs at an initial first point in time T1. The example 1000 includes an allocation pool 1010 and processing cores or processes C1 1002 and C2 1004. The allocation pool 1011 may be implemented as a linked list, such as a doubly linked list, or other suitable structure. Each buffer of the allocation pool is uniquely identified using a buffer ID of Bn, where n is an integer value from 1 to 100, inclusively. The allocation pool 1011 includes a head pointer 1010 pointing to the head, front or first element of the list of buffers in the allocation pool 1011. The tail pointer 1012 points to the last or tail element of the list of buffer in the allocation pool 1011.

At a second point in time T2 subsequent to T1, buffer B1 is allocated for use by C1 1002 and buffer B2 is allocated for use by C2 1004. Thus, buffer B1 is included in the log used by C1 1002 for recording messages such as trace messages. Buffer B2 is included in the log used by C2 1004 for recording messages such as trace messages.

Figure 8B:
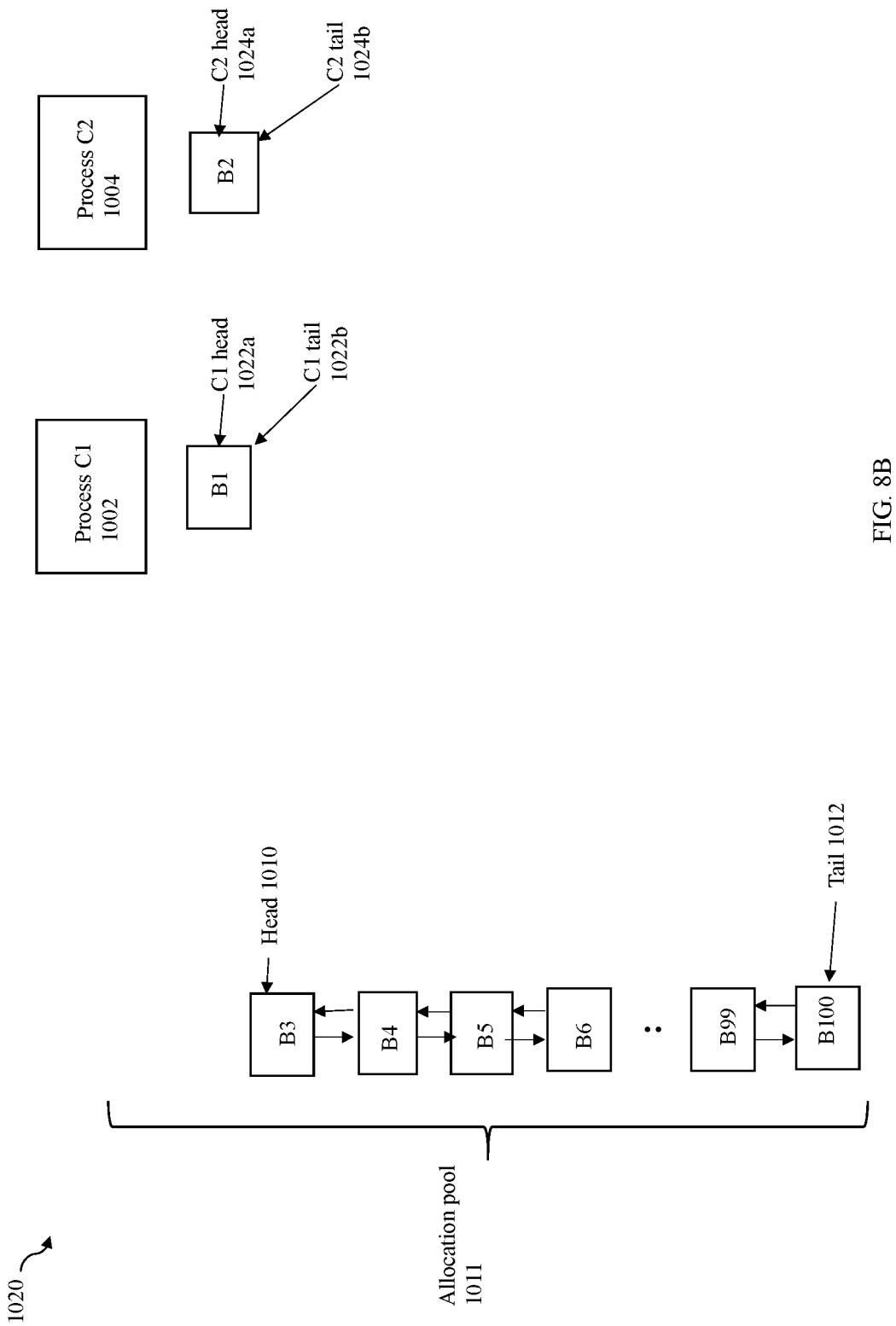

FIG. 8B illustrates the state of the structures at this second point in time T2 after the buffers B1 and B2 have be allocated, respectively for the logs of C1 1002 and C2 1004. In the example 1020, C1 head 1022a points to the first or head buffer of C1's log and C1 tail 1022b points to the last or tail buffer of C1's log. C1 head 1022a points to the oldest or least recently used buffer of the log of C1. C1 tail 1022b points to the newest and most recently used buffer of the log of C1. C2 head 1024a points to the first or head buffer of C2's log and C2 tail 1024b points to the last or tail buffer of C2's log. C2 head 1024a points to the oldest or least recently used buffer of the log of C2. C2 tail 1024b points to the newest and most recently used buffer of the log of C2. In at least one embodiment, the list of buffers included in each of the logs may be maintained as a linked list, such as single or doubly linked list.

In the FIG. 8B, the log for C1 includes only B1 and the log for C2 includes only B2. C1 is actively writing messages to B1 and C2 is actively writing messages to B2. Assume now at a third point in time T3 (subsequent to T2) that C2 has filled up B2 to a specified threshold level. Responsive to C2 filling up B2 to a specified threshold level, C2 requests another buffer that is allocated from the head 1010 of the allocation pool. In this case, B3 is allocated to C2.

Figure 8C:
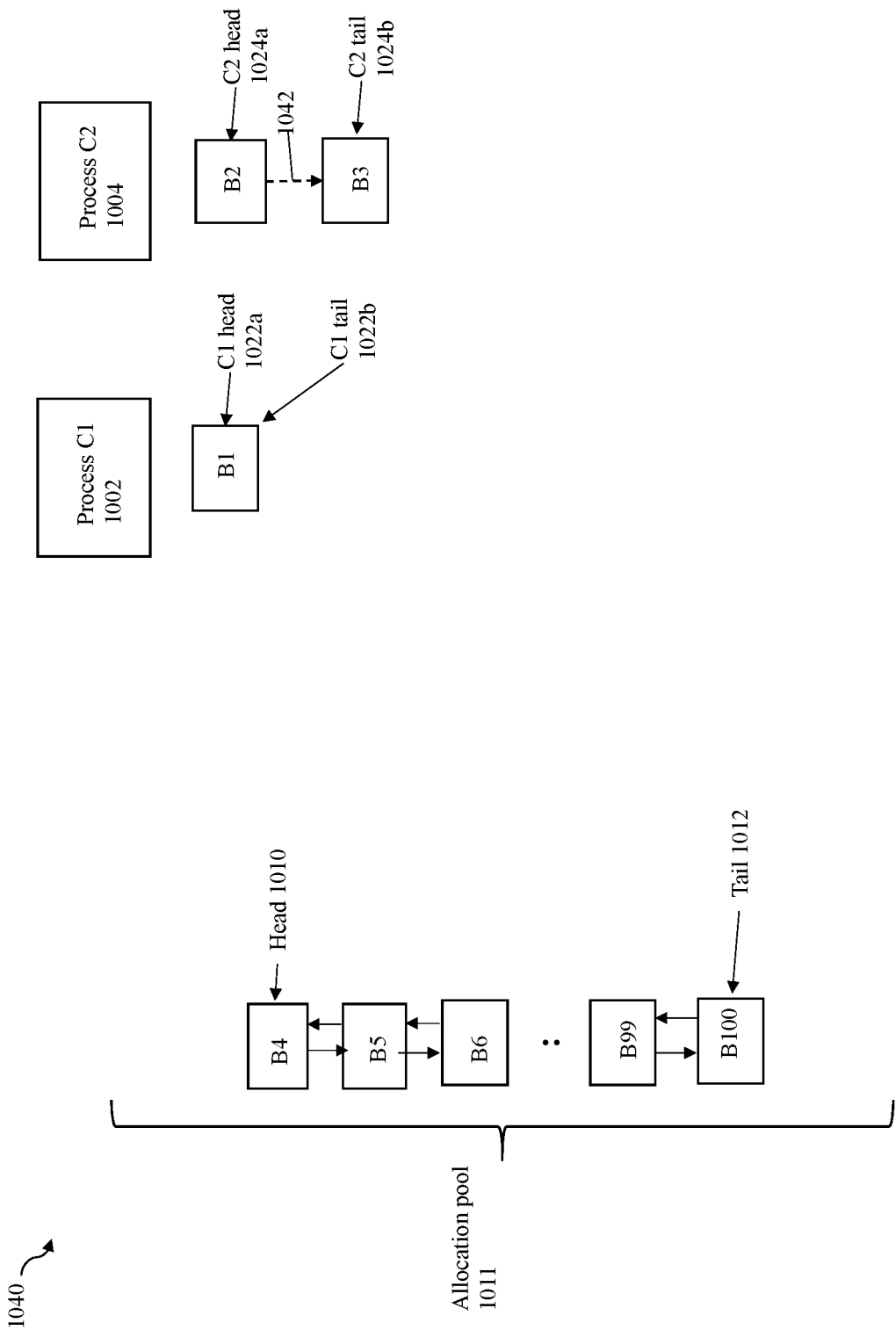

Referring to the FIG. 8C, shown is the state of the structures at the third point in time T3 after B3 has been allocated to C2. In this example 1040, the newly allocated buffer B3 is added to the tail of C2's list of buffers. Buffer B2 is connected 1042 to the buffer B3 in the C2's list of buffers.

At a fourth point in time T4 subsequent to T3, assume that buffer B2 is now filled by C2. Responsive to filling B2, B2 is appended to the tail 1012 of the allocation pool 1011.

Figure 8D:
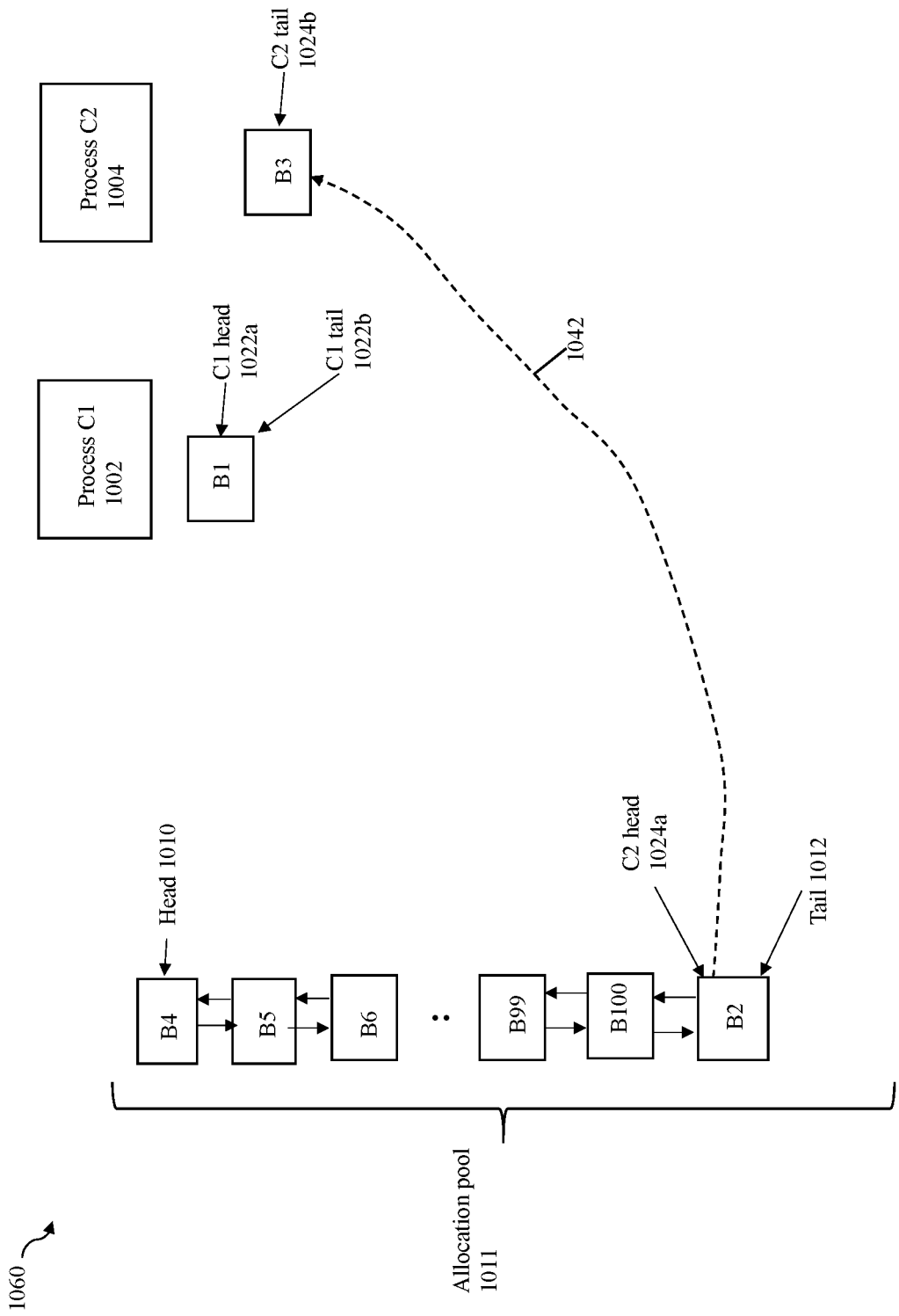

Referring to the FIG. 8D, shown is the state of the structures at the fourth point in time T4 after B2 has been appended to the tail 1012 of the allocation pool 1011. In this example 1060, the filled buffer B2 is added to the tail 1012 of the list of buffers of the allocation pool 1011. However, note that B2 is not removed from the list of buffers used by C2. At this time T4, B2 is included in both the allocation pool 1011 and also included in the list of buffers of the log of C2. In this manner, a filled buffer may remain in use by a log until it is reallocated for use by a different log when the filled buffer reaches the head position 1010 of the allocation pool 1011.

At a fifth point in time T5 subsequent to T4, assume C1 is almost done filling up buffer B1. Responsive to C1 filling up B1 to a specified threshold level, C1 requests another buffer that is allocated from the head 1010 of the allocation pool. In this case, B4 is allocated to C1.

Figure 8E:
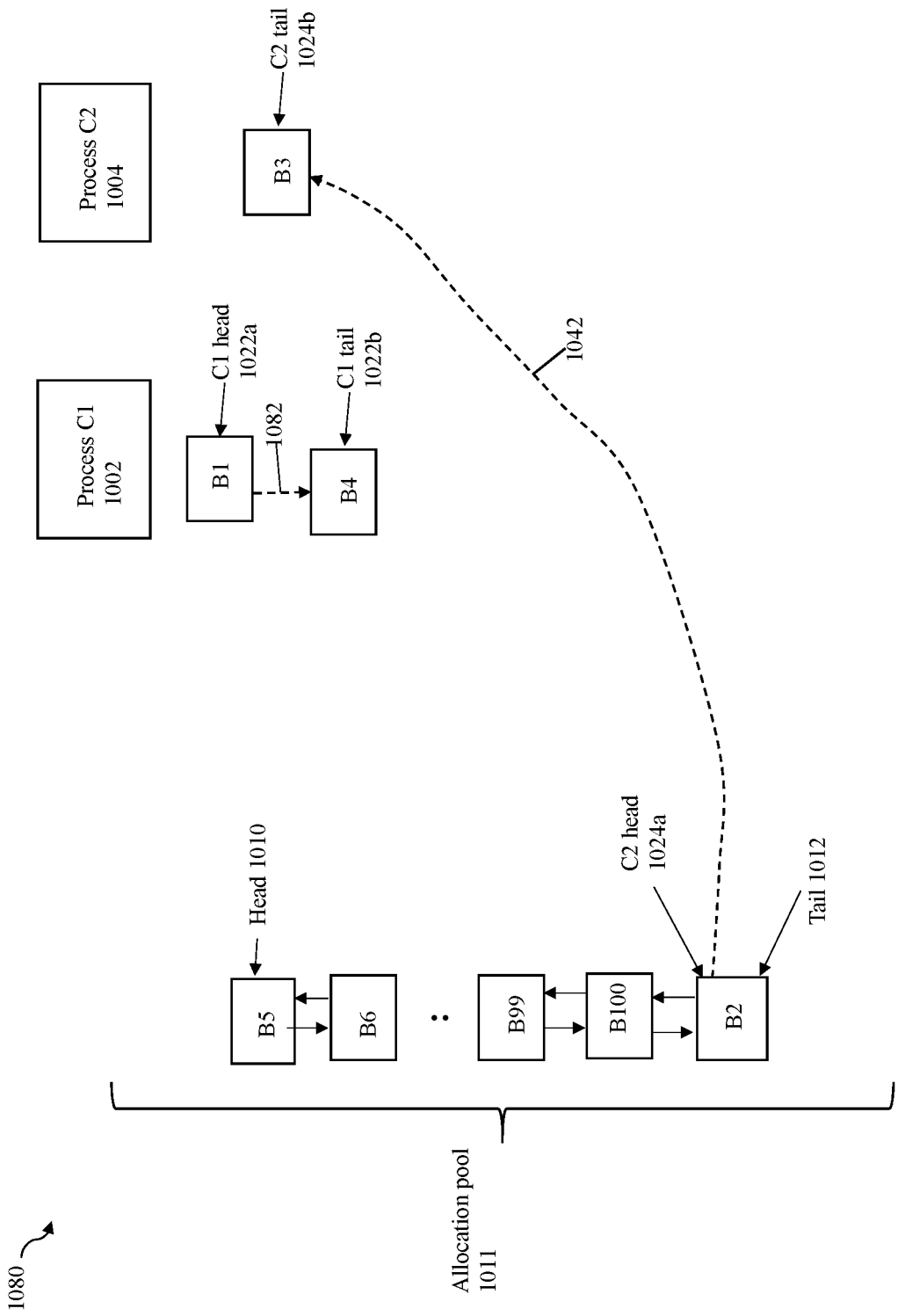

Referring to the FIG. 8E, shown is the state of the structures at the fifth point in time T5 after B4 has been allocated to C1. In this example 1080, the newly allocated buffer B4 is added to the tail of C1's list of buffers. Buffer B1 is connected 1082 to the buffer B4 in the C1's list of buffers.

At a sixth point in time T6 subsequent to T5, assume that buffer B1 is now filled by C1. Responsive to filling B1, as illustrated in FIG. 8F and discussed in more detail below, B1 is appended to the tail 1012 of the allocation pool 1011.

Figure 8F:
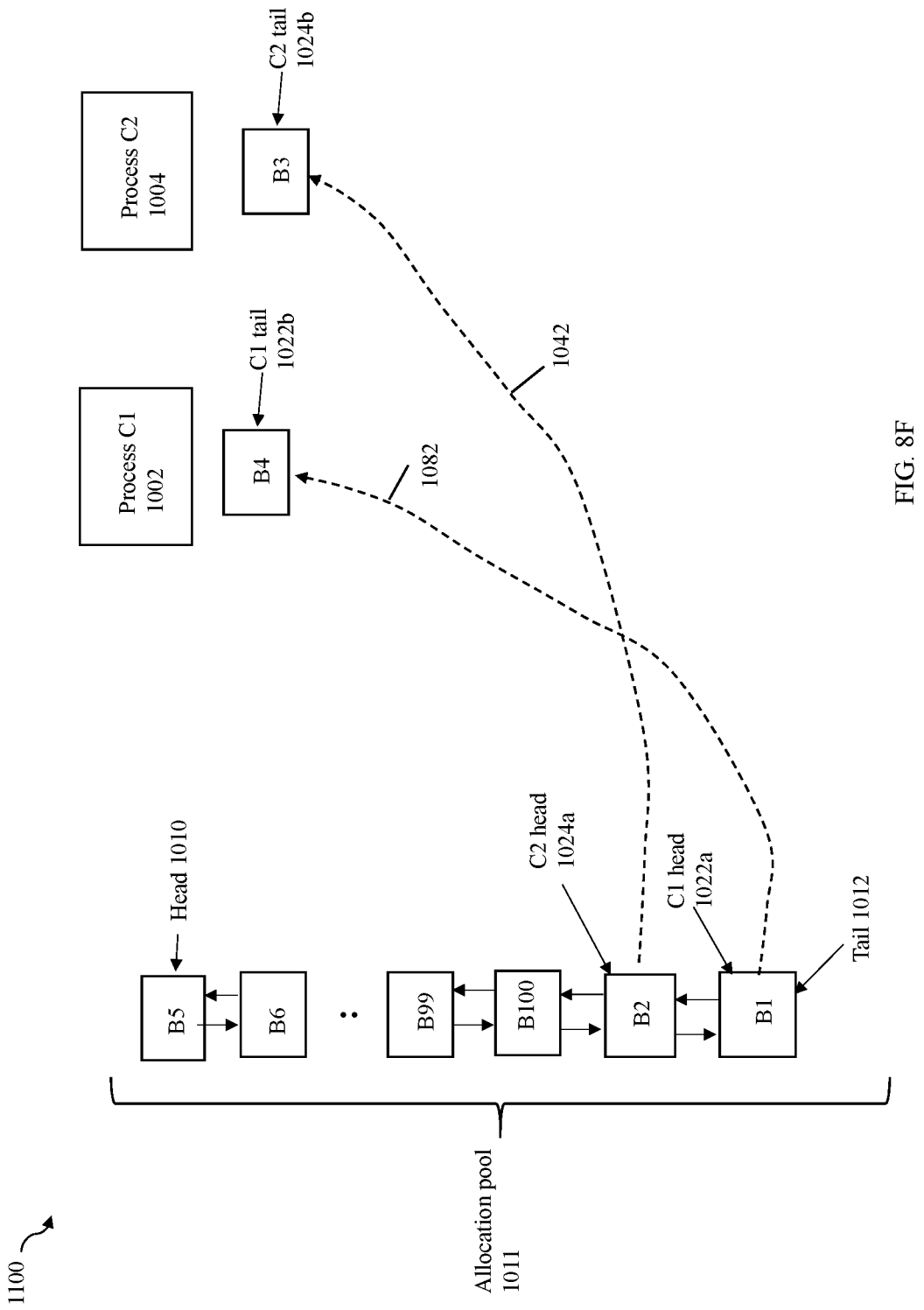

Referring to the FIG. 8F, shown is the state of the structures at the sixth point in time T6 after B1 has been appended to the tail 1012 of the allocation pool 1011. In this example 1100, the filled buffer B1 is added to the tail 1012 of the list of buffers of the allocation pool 1011. However, although that B1 in the FIG. 8F has been added to the allocation pool 1011 (e.g., and no longer appears in the FIG. 8F directly under C1 1002) note that B1 is not removed from the list of buffers used by C1. Consistent with other discussion herein, the buffers associated with C1 and also C2 and included in their respective logs are determined using the linked lists of buffers for C1 and C2. The buffers included in the log of C2 are denoted by the linked list from C2 head 1024a to the C2 tail 1024b (e.g. C2 log includes B2 and B3 in FIG. 8F), and the buffers included in the log of C1 are denoted by the linked list from C1 head 1022a to the C1 tail 1022b (e.g., C1 log includes buffers B1 and B4 in FIG. 8F).

At this time T6, B1 is included in both the allocation pool 1011 and also included in the list of buffers of the log of C1. In this manner, a filled buffer may remain in use by a log until it is reallocated for use by a different log when the filled buffer reaches the head position 1010 of the allocation pool 1011.

At the time T6, the log of C2 includes buffers B2 and B3 (as denoted by the linked list from C2 head 1024a to the C2 tail 1024b), and the log of C1 includes buffers B1 and B4 (as denoted by the linked list from C1 head 1022a to the C1 tail 1022b).

At a seventh point in time T7 subsequent to T6, assume that C1 is almost done filling B4 and fills B4 to a specified threshold level. Responsive to filling B4 to a specified threshold level, C1 requests a new buffer allocation and is allocated buffer B5 from the head 1010 of the allocation pool.

Figure 8G:
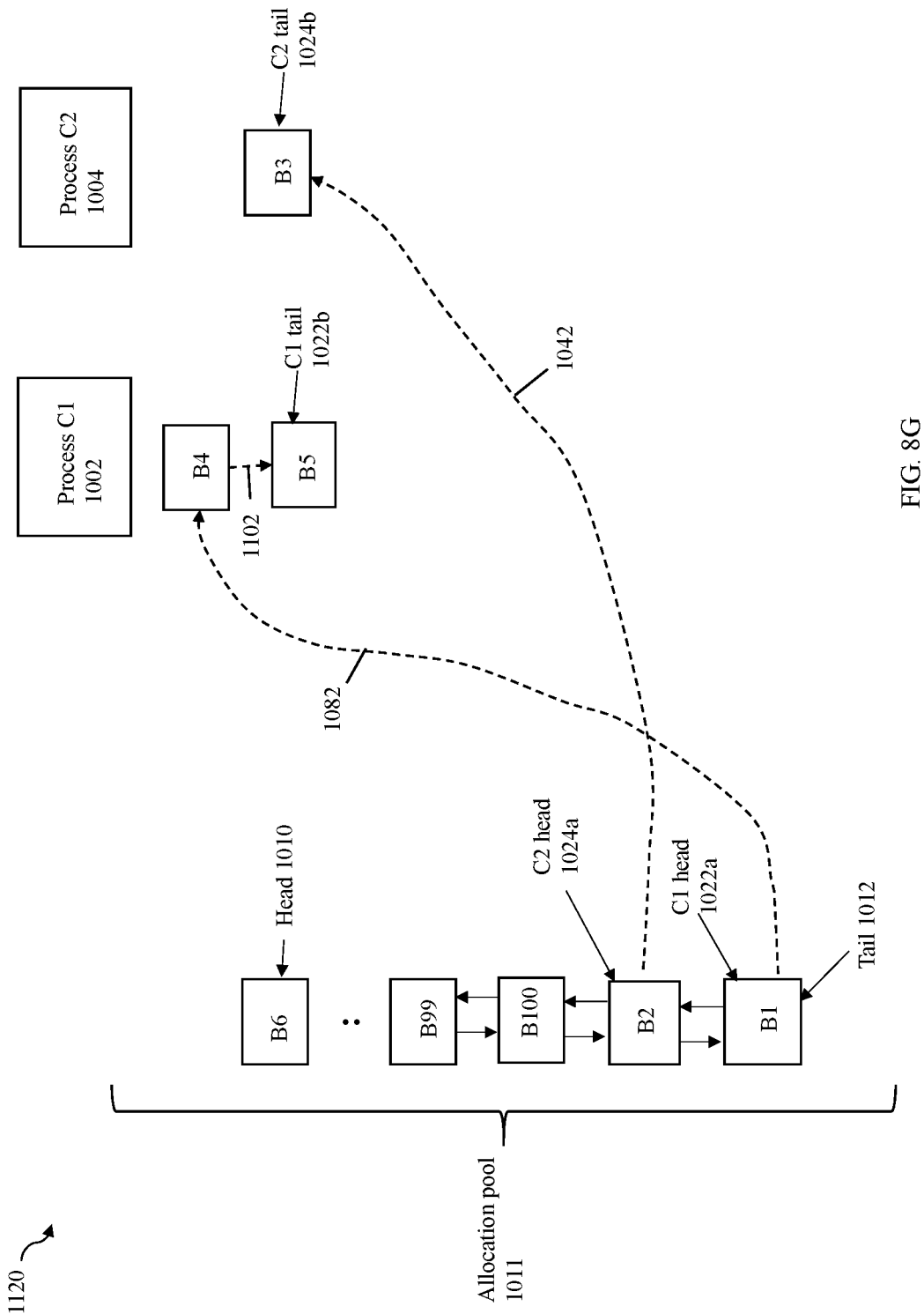

Referring to the FIG. 8G, shown is the state of the structures at the seventh point in time T7 after B5 has been allocated to C1. In this example 1120, the newly allocated buffer B5 is added to the tail of C1's list of buffers. Buffer B4 is connected 1102 to the buffer B5 in the C1's list of buffers.

At an eight point in time T8 subsequent to T7, assume that buffer B4 is now filled by C1. Responsive to filling B4, B4 is appended to the tail 1012 of the allocation pool 1011.

Figure 8H:
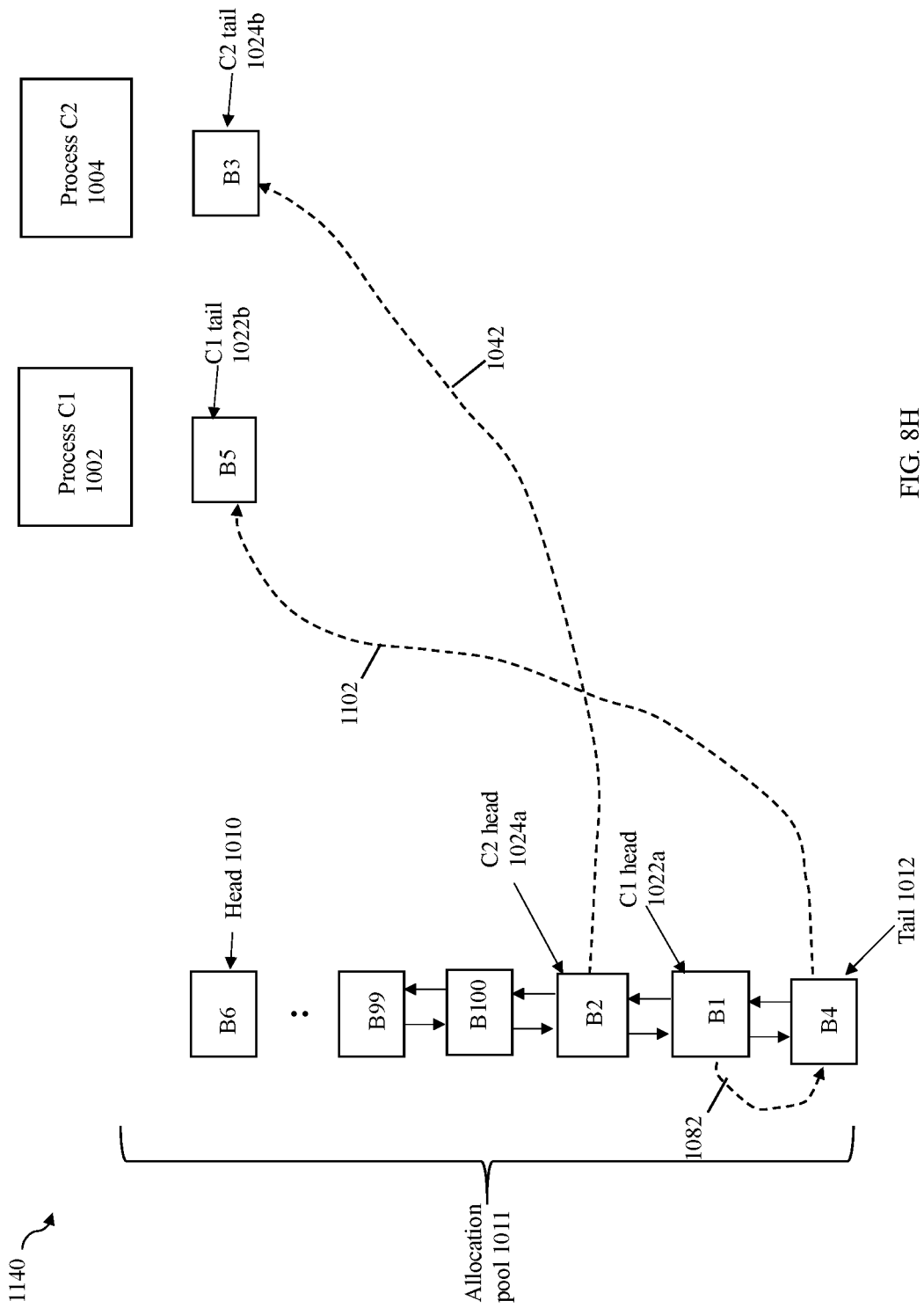

Referring to the FIG. 8H, shown is the state of the structures at the eighth point in time T8 after B4 has been appended to the tail 1012 of the allocation pool 1011. In this example 1140, the filled buffer B4 is added to the tail 1012 of the list of buffers of the allocation pool 1011. However, note that B4 is not removed from the list of buffers used by C1. At this time T8, B4 is included in both the allocation pool 1011 and also included in the list of buffers of the log of C1. In this manner, a filled buffer may remain in use by a log until it is reallocated for use by a different log when the filled buffer reaches the head position 1010 of the allocation pool 1011.

At time T8 as illustrated in the FIG. 8H, the log of C2 includes buffers B2 and B3 (as denoted by the linked list from C2 head 1024a to the C2 tail 1024b), and the log of C1 includes buffers B1, B4 and B5 (as denoted by the linked list from C1 head 1022a to the C1 tail 1022b).

Assume that processing continues to write to the various buffers and that buffers are allocated on demand. Expanding on the example, assume that there are other processing cores not illustrated in the FIG. 8H and, in a manner consistent with discussion above, other buffers of the allocation pool are continually allocated on demand and filled buffers are continually added to the tail 102 of the allocation pool.

At a ninth point in time T9 subsequent to T8, buffer B2 eventually progresses to the front, first or head position of the allocation pool 1011 where the buffer B2 is pointed to by the head pointer 1010 of the pool 1011.

Figure 8I:
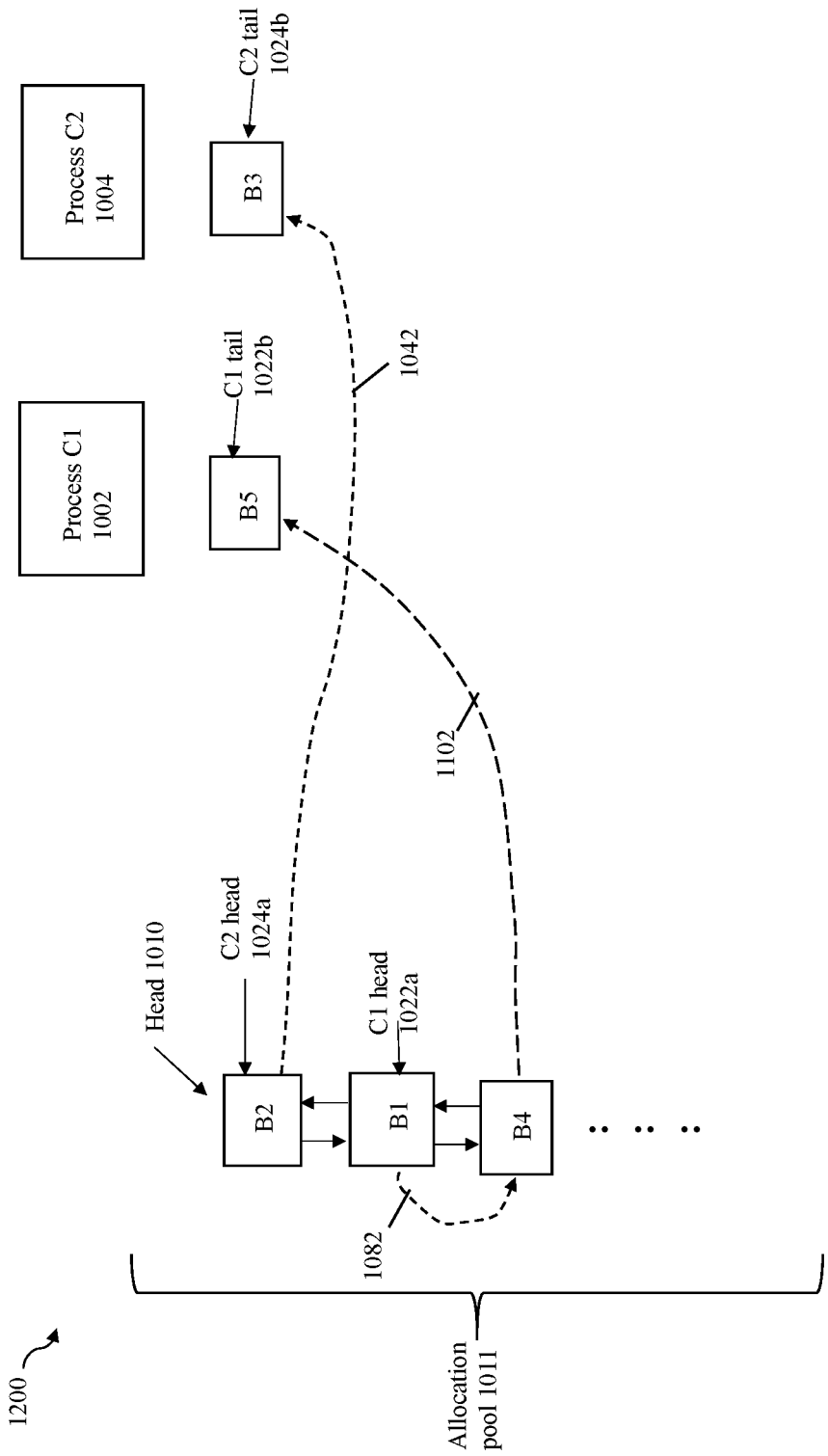

Reference is made to FIG. 8I illustrating the state of the structures at time T9. In the example 1200, the head pointer 1010 of the allocation pool 1011 points to the filled buffer B2 that is also included in the linked list of buffers of C2's log. At time T9 as illustrated in the FIG. 8I, the log of C2 includes buffers B2 and B3 (as denoted by the linked list from C2 head 1024a to the C2 tail 1024b), and the log of C1 includes buffers B1, B4 and B5 (as denoted by the linked list from C1 head 1022a to the C1 tail 1022b). Thus, B2 will be the next buffer allocated on demand from the allocation pool 1011. Thus B2 is the next buffer of the allocation pool 1011 to be recycled or reused.

Assume now at a tenth point in time T10 subsequent to T9 that C1 fills B5 to a specified threshold level. Responsive to filling B5 to the specified threshold level, C1 requests a new buffer allocation from the allocation pool 1011 and C1 is allocated buffer B2 from the allocation pool. At an eleventh point in time T11 subsequent to T10, assume that C1 completes filling B5. Responsive to completely filling B5, B5 is appended to the tail of the allocation pool.

Figure 8J:
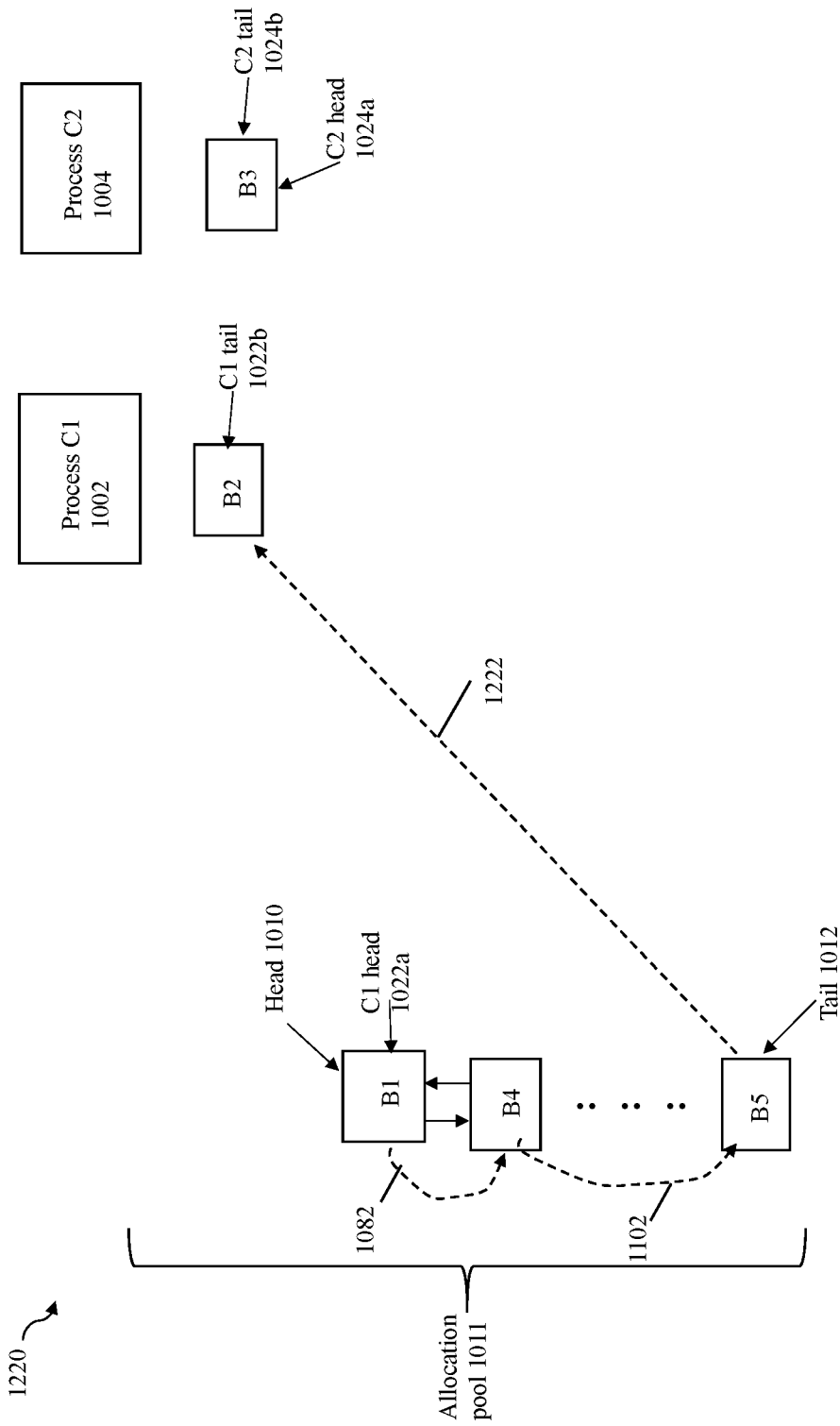

Referring to FIG. 8J, shown is the state of the structures at the time T11 after B2 has been allocated to C1 and included in C1's log, and also after B5 is appended to the tail 1012 of the allocation pool 1011. At time T11 as illustrated in the FIG. 8J, the log of C2 includes buffer B3 (as denoted by the linked list from C2 head 1024a to the C2 tail 1024b), and the log of C1 includes buffers B1, B4, B5 and B2 (as denoted by the linked list from C1 head 1022a to the C1 tail 1022b).

As illustrated in the foregoing example, each process or processing core may consume a variable number of buffers for its log at different points in time based on its current logging rate. When a new buffer is needed for storing additional messages of a log, the new buffer may be allocated from the head of the allocation pool. The linked list of buffers of the allocation pool 1011 (as denoted by the linked list from the head pointer 1010 to the tail pointer 1012) includes a time ordered list of buffers of messages included in the logs of all the processing cores, such as C1 1002 and C2 1004.

In at least one embodiment, the memory buffers of the allocation pool and the buffers currently or actively being filled by a processing core may be included in a GM segment. For example, reference is made to FIG. 9 which includes similarly number elements as described in connection with FIG. 3. Referring back to FIG. 3, illustrated is an embodiment in which the trace buffers for recording trace messages of processing cores on a single computing module are stored in a dedicated local memory that is not configured as part of the distributed global memory (GM). For example, trace buffers 307, 309, 311 are used to record trace messages respectively by processing cores 306, 308, 310 of the computing module 302. The trace buffers 307, 309 and 311 are stored in the dedicated local memory 304 of the computing module 302 where the dedicated local memory 304 is not configured as part of the distributed GM 312. In contrast in the FIG. 9, the allocation pool 1320 and the trace buffers 1306, 1308, 1310 actively or currently being written to, respectively, by processing cores 306, 308, 310 are stored in the distributed GM segment 314.

Figure 9:
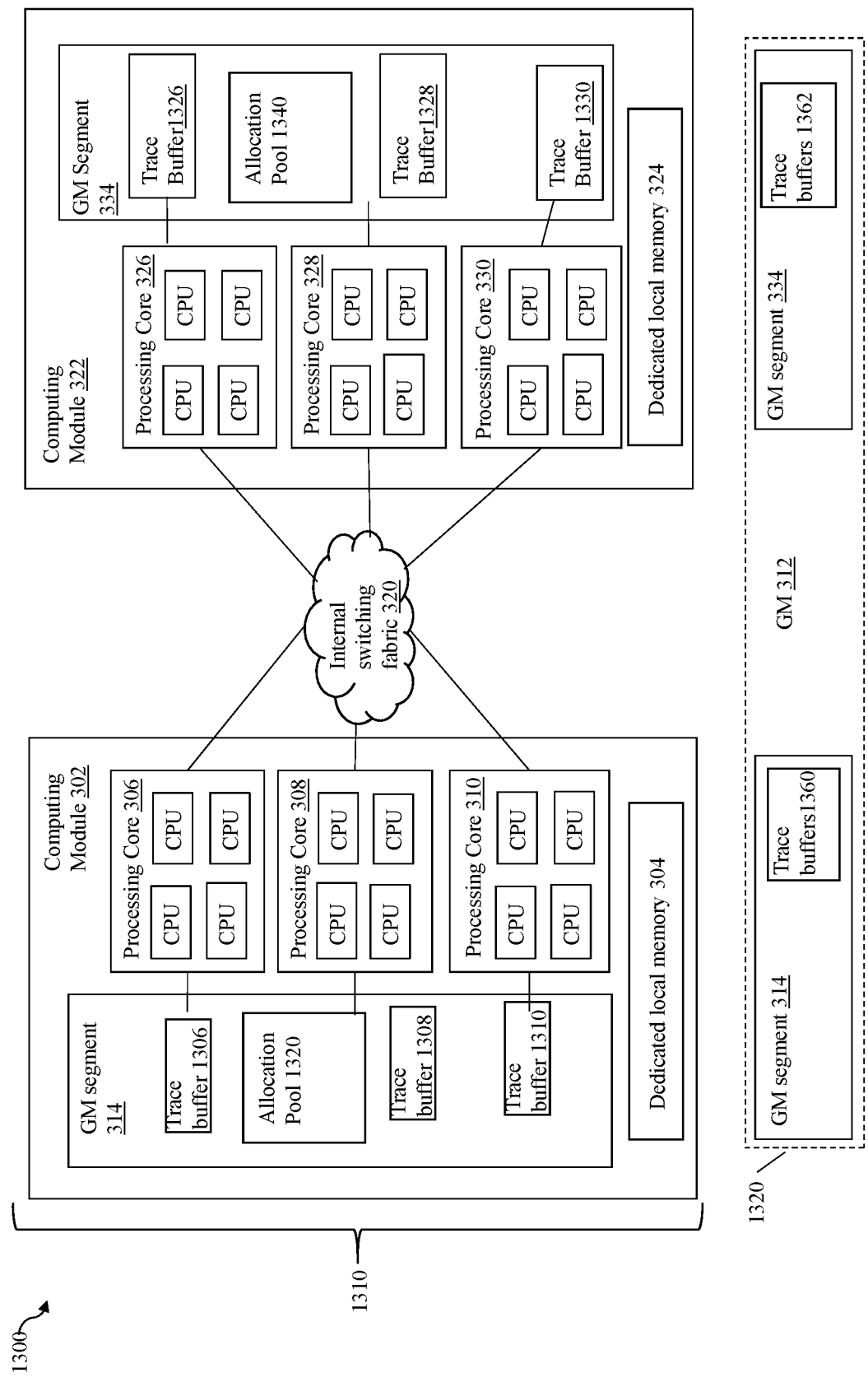
FIG. 9 is an example illustrating components of a system configured in accordance with the techniques herein.

In connection with computing module 322 in the FIG. 9, the allocation pool 1340 and the trace buffers 1326, 1328, 1330 actively or currently being written to, respectively, by processing cores 326, 328, 330 are stored in the distributed GM segment 334.

In the embodiment shown in FIG. 9, trace buffers of logs used by processing cores of a computing module are included in a distributed GM segment also included in the same computing module. In this manner, the trace buffers of the logs for the processing cores of the computing module may be accessed locally from the computing module's local GM segment without having to use the internal switching fabric 320. For example, the processing cores 306, 308, 310 may access trace buffers of their logs from the local GM segment 314 without using the internal switching fabric; and the processing cores 326, 328, 330 may access trace buffers of their logs from the local GM segment 334 without using the internal switching fabric.

Element 1320 provides a logical view of the distributed GM across the GM segments of all computing modules or boards in a manner similar to element 301 of FIG. 3. As illustrated, trace buffers 1360 included in the logs of processing cores 306, 308, 310 are all included in the GM segment 314; and trace buffers 1362 included in the logs of processing cores 326, 328, 330 are all included in the GM segment 334.

In at least one embodiment, a portion of the GM segment on each of the computing modules may be used for buffers of the allocation pool, such as trace buffers available for use with any log of any processing core included on the same computing module as the GM segment. In at least one embodiment, the foregoing portion of each GM segment may be the same size. As a variation, the foregoing portion size may vary for one or more GM segments.

If a user wants to view and/or analyze a time ordered list of all the messages, such as trace messages across all computing modules of the system, processing may be performed to access the list of buffers of the allocation pool in each of the computing modules of the system. In at least one embodiment, the aggregated list of all messages may not include those messages in the currently active buffers being written to by the processing cores. For example, reference is made back to FIG. 8H where the aggregated list of message across the system may not include the messages in buffers B5 and B3 (e.g., B5 is currently in use by C1 for logging C1's messages and B3 is current in use by C2 for logging C2's messages).

In at least one embodiment the size of each buffer may be selected based on the logging rate of a majority of the processes. Generally, the lower logging rate of the processing cores, the smaller the buffer size. If the processing cores have a higher logging rate and therefore are quick to consume or fill a buffer, the buffer size may be larger.

Figure 10:
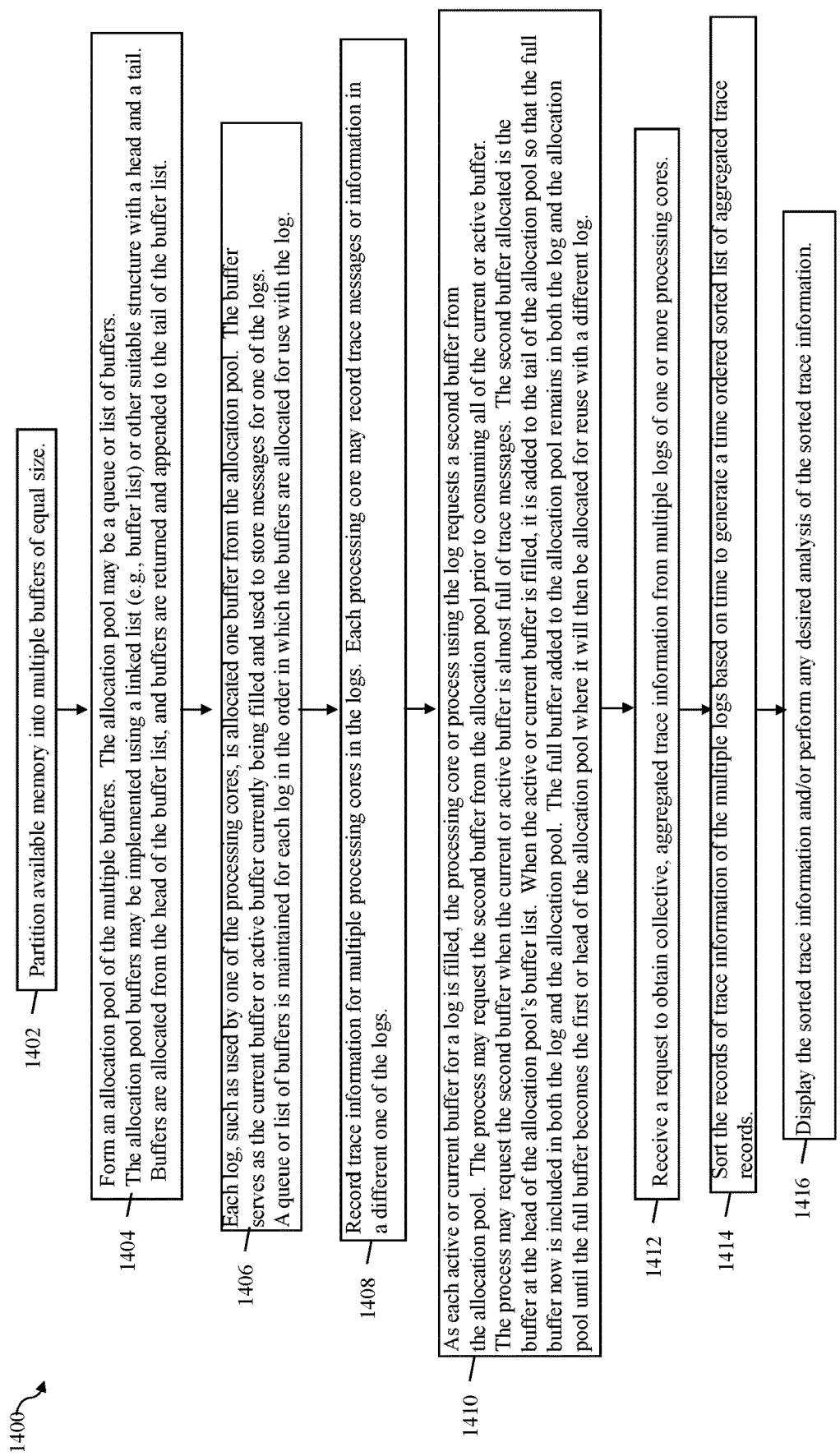
FIG. 10 is a flowchart of processing steps that may be performed in an embodiment in accordance with the techniques herein.

Referring to FIG. 10, shown is a flowchart that may be performed in an embodiment in accordance with the techniques herein. The flowchart 1400 summarizes processing described above with respect a single computing module. Although processing of the flowchart 1400 is described below with respect to a single computing module where the steps 1402, 404, 1406, 1408 and 1410 are performed for a single computing module, the step 1402, 1404, 1406, 1408 and 1410 may be performed for each computing module. Subsequently, the steps 1412, 1414 and 1416 may then be performed to obtain the aggregated trace information across multiple computing modules in the system.

At the step 1402, the available memory for use with the log buffers may be partitioned into multiple buffers of the same size. The available memory of a computing module may be included in a GM segment that is local to the computing module. The buffers may be used only for logs of processing cores included in the computing module. In at least one embodiment, processing cores of other computing modules may not use buffers from the GM segment of the computing module. In such an embodiment, a processing core on a computing module may only be allowed to use buffers from the GM segment that is local to (e.g. included on) the same computing module as the processing core. From the step 1402, control proceeds to the step 1404.

At the step 1404, an allocation pool may be formed from the multiple buffers from the step 1402. The allocation pool may be a queue or list of buffers. The allocation pool buffers may be implemented using a linked list (e.g., buffer list) or other suitable structure with a head and a tail. Buffers may be allocated from the head of the buffer list, and buffers may be returned and appended to the tail of the buffer list. From the step 1404, control proceeds to the step 1406.

At the step 1406, each log, such as used by one of the processing cores, is allocated one buffer from the allocation pool. The buffer serves as the current buffer or active buffer currently being filled and used to store messages for one of the logs. A queue or list of buffers is maintained for each log in the order in which the buffers are allocated for use with the log. From the step 1406, control proceeds to the step 1408.

At the step 1408, trace information may be recorded for multiple processing cores in the logs used for logging trace messages. Each processing core may record trace messages or information in a different one of the logs. From the step 1408, control proceeds to the step 1410.

At the step 1410, as each active or current buffer for a log is filled, the processing core or process using the log requests a second buffer from the allocation pool. The process may request the second buffer from the allocation pool prior to consuming all of the current or active buffer. The process may request the second buffer when the current or active buffer is almost full of trace messages, such as when a specified amount of the current or active buffer has been filled. The second buffer allocated is the buffer at the head of the allocation pool's buffer list. When the active or current buffer is filled, it is added to the tail of the allocation pool so that the full buffer now is included in both the log and the allocation pool. The full buffer added to the allocation pool remains in both the log and the allocation pool until the full buffer becomes the first or head of the allocation pool where it will then be allocated for reuse with a different log. From the step 1410, control proceeds to the step 1412.

At the step 1412, a request may be received to obtain collective, aggregated trace information for one or more processing cores. The request may identify all or the one or more particular computing modules for which the trace information is aggregated. The step 1412 may include accessing the buffers in the allocation pools of the one or more processing cores. From the step 1412, control proceeds to the step 1414. At the step 1414, the records of trace information of the multiple logs may be sorted based on time to generate a time ordered sorted list of aggregated trace records. From the step 1414, control proceeds to the step 1416. At the step 1416, the sorted, aggregated trace information from the step 1414 may be displayed and/or analyzed as may be desired depending on the particular application or use of the sorted aggregated trace information.

It should be noted that, as described elsewhere herein, the trace records may also be adjusted or modified due to time differences between computing modules as reflected in the trace records.

The techniques herein may be performed using any suitable hardware and/or software. For example, the techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of memory management comprising:
    allocating, from an allocation pool of memory, a plurality of buffers for a plurality of logs used by a plurality of processing cores, wherein each of the plurality of logs is used to log messages for a different one of the plurality of processing cores, wherein each of the plurality of buffers is included in a different one of the plurality of logs, and wherein for each of the plurality of logs, a list of buffers included in said each log is maintained, wherein a first list of buffers for a first log of the plurality of logs includes a first buffer of the plurality of buffers indicating that the first buffer is included in the first log;
    recording messages in the plurality of logs for the plurality of processing cores;
    responsive to the first buffer, that is included in the first log that is used to record messages for a first processing core of the plurality of processing cores, having less than a minimum threshold amount of unconsumed buffer space, allocating a second buffer of the allocation pool for the first log;
    adding the second buffer to the first list of buffers for the first log, wherein after adding the second buffer to the first list, the first list includes the first buffer and the second buffer; and
    responsive to filling the first buffer so that the first buffer is no longer a current active buffer that is written to and used for recording messages of the first processing core, performing first processing including:
        recording subsequent messages of the first log for the first processing core in the second buffer, wherein the second buffer is the current active buffer that is written to and used for recording messages of the first processing core; and
        adding the first buffer, that is included in the first list for the first log, to a tail of the allocation pool, wherein after adding the first buffer to the tail of the allocation pool, the first buffer is included in the first list of buffers for the first log and is also included in the allocation pool, wherein the first buffer, that is filled with messages of the first log, remains in both the allocation pool and the first log as the first buffer progresses from the tail of the allocation pool to a head of the allocation pool as other buffers of the allocation pool are allocated from the head of the allocation pool prior to the first buffer, and where the first buffer remains in both the allocation pool and the first log until the first buffer at the head of the allocation pool is subsequently reallocated from the allocation pool.

2. The method of claim 1, wherein the allocation pool comprises a second list of buffers, and wherein allocating a requested buffer from the allocation pool includes allocating the requested buffer from a head of the second list, and wherein adding a particular buffer to the allocation pool includes appending the particular buffer to a tail of the second list, wherein the tail of the second list is the tail of the allocation pool and the head of the second list is the head of the allocation pool.

3. The method of claim 2, wherein said adding the first buffer to the allocation pool appends the first buffer to the tail of the second list.

4. The method of claim 3, wherein the second buffer is located at the head of the second list and wherein said allocating the second buffer removes the second buffer from the second list and adds the second buffer to the first list of buffers of the first log.

5. The method of claim 4, wherein buffers of the first list are ordered based on an order in which each buffer of the first list is allocated for the first log to record events for the first processing core.

6. The method of claim 4, subsequent to adding the first buffer to the allocation, the method further comprises performing processing including:
    allocating a second plurality of buffers from the allocation pool for one or more of the plurality of logs, wherein subsequent to allocating the second plurality of buffers, said first buffer is at the head of the second list of buffers included in the allocation pool; and
    allocating the first buffer for a second log of the plurality of logs, wherein said second log is different from the first log, wherein said allocating the first buffer for the second log includes removing the first buffer from the allocation pool, adding the first buffer to a third list of buffers of the second log, and removing the first buffer from the first list of buffers for the first log.

7. The method of claim 1, wherein a distributed global memory includes a plurality of global memory portions of a plurality of computing modules, wherein the allocation pool of memory and the plurality of processing cores are included in a same one of the plurality of computing modules, and wherein the allocation pool of memory is included in a first global memory portion of the distributed global memory.

8. The method of claim 7, wherein the first global memory portion is included in the same one computing module as the plurality of processing cores and wherein the first global memory portion is configured to be accessed locally by the plurality of processing cores without using an internal switching fabric.

9. The method of claim 8, wherein each of the plurality of computing modules includes a different plurality of processing cores configured to locally access one of the plurality of global memory portions included in said each computing module without using the internal switching fabric, and wherein the different plurality of processing cores of said each computing module are configured to access other global memory portions of the distributed global memory, that are not included in the said each computing module, using the internal switching fabric.

10. The method of claim 9, wherein each of the plurality of global memory portions is included in one of the plurality of computing modules, and wherein said one computing module includes a corresponding allocation pool of buffers used for logging messages of processing cores included in said one computing module.

11. The method of claim 10, further comprising:
receiving a request to aggregate a plurality of logs of at least two of the plurality of computing modules, wherein the plurality of logs includes a first set of logs and a second set of logs;
obtaining the first set of logs from one global memory portion of the distributed global memory, wherein the one global memory portion is included in a first computing module of the plurality of computing modules;
obtaining the second set of logs from a second global memory portion of the distributed global memory, wherein the second global memory portion is included in a second computing module of the plurality of computing modules; and
sorting records of the plurality of logs in accordance with a time associated with each of the records.

12. The method of claim 1, wherein each of the plurality of processing cores has only a single associated current active buffer to which messages of a corresponding one of the plurality of logs are written, and wherein, at a first point in time, the current active buffer for the first processing core is the first buffer, and, at a subsequent second point in time, the current active buffer for the first processing core is the second buffer.

13. The method of claim 1, wherein the first list of buffers for the first log, from a head of the first list to a tail of the first list, are ordered in accordance with a time order in which buffers are allocated from the allocation pool for inclusion in the first log, and wherein buffers of the first list are sequentially filled with recorded messages of the first log, from the head of the first list to the tail of the first list, in the time order in which buffers of the first list are allocated from the allocation pool.

14. A system comprising:
one or more processors; and
one or more memories comprising code that, when executed, performs a method of memory management comprising:
allocating, from an allocation pool of memory, a plurality of buffers for a plurality of logs used by a plurality of processing cores, wherein each of the plurality of logs is used to log messages for a different one of the plurality of processing cores, wherein each of the plurality of buffers is included in a different one of the plurality of logs, and wherein for each of the plurality of logs, a list of buffers included in said each log is maintained, wherein a first list of buffers for a first log of the plurality of logs includes a first buffer of the plurality of buffers indicating that the first buffer is included in the first log;
recording messages in the plurality of logs for the plurality of processing cores;
responsive to the first buffer, that is included in the first log that is used to record messages for a first processing core of the plurality of processing cores, having less than a minimum threshold amount of unconsumed buffer space, allocating a second buffer of the allocation pool for the first log;
adding the second buffer to the first list of buffers for the first log, wherein after adding the second buffer to the first list, the first list includes the first buffer and the second buffer; and
responsive to filling the first buffer so that the first buffer is no longer a current active buffer that is written to and used for recording messages of the first processing core, performing first processing including:
recording subsequent messages of the first log for the first processing core in the second buffer, wherein the second buffer is the current active buffer that is written to and used for recording messages of the first processing core; and
adding the first buffer, that is included in the first list for the first log, to a tail of the allocation pool, wherein after adding the first buffer to the tail of the allocation pool, the first buffer is included in the first list of buffers for the first log and is also included in the allocation pool, wherein the first buffer, that is filled with messages of the first log, remains in both the allocation pool and the first log as the first buffer progresses from the tail of the allocation pool to a head of the allocation pool as other buffers of the allocation pool are allocated from the head of the allocation pool prior to the first buffer, and where the first buffer remains in both the allocation pool and the first log until the first buffer at the head of the allocation pool is subsequently reallocated from the allocation pool.

15. A non-transitory computer readable medium comprising code stored thereon that, when executed, performs a method of memory management comprising:
allocating, from an allocation pool of memory, a plurality of buffers for a plurality of logs used by a plurality of processing cores, wherein each of the plurality of logs is used to log messages for a different one of the plurality of processing cores, wherein each of the plurality of buffers is included in a different one of the plurality of logs, and wherein for each of the plurality of logs, a list of buffers included in said each log is maintained, wherein a first list of buffers for a first log of the plurality of logs includes a first buffer of the plurality of buffers indicating that the first buffer is included in the first log;
recording messages in the plurality of logs for the plurality of processing cores;
responsive to the first buffer, that is included in the first log that is used to record messages for a first processing core of the plurality of processing cores, having less than a minimum threshold amount of unconsumed buffer space, allocating a second buffer of the allocation pool for the first log;
adding the second buffer to the first list of buffers for the first log, wherein after adding the second buffer to the first list, the first list includes the first buffer and the second buffer; and
responsive to filling the first buffer so that the first buffer is no longer a current active buffer that is written to and used for recording messages of the first processing core, performing first processing including:

recording subsequent messages of the first log for the first processing core in the second buffer, wherein the second buffer is the current active buffer that is written to and used for recording messages of the first processing core; and adding the first buffer, that is included in the first list for the first log, to a tail of the allocation pool, wherein after adding the first buffer to the tail of the allocation pool, the first buffer is included in the first list of buffers for the first log and is also included in the allocation pool, wherein the first buffer, that is filled with messages of the first log, remains in both the allocation pool and the first log as the first buffer progresses from the tail of the allocation pool to a head of the allocation pool as other buffers of the allocation pool are allocated from the head of the allocation pool prior to the first buffer, and where the first buffer remains in both the allocation pool and the first log until the first buffer at the head of the allocation pool is subsequently reallocated from the allocation pool.

16. The non-transitory computer readable medium of claim 15, wherein the allocation pool comprises a second list of buffers, and wherein allocating a requested buffer from the allocation pool includes allocating the requested buffer from a head of the second list, and wherein adding a particular buffer to the allocation pool includes appending the particular buffer to a tail of the second list, wherein the tail of the second list is the tail of the allocation pool and the head of the second list is the head of the allocation pool.

17. The non-transitory computer readable medium of claim 16, wherein said adding the first buffer to the allocation pool appends the first buffer to the tail of the second list.

18. The non-transitory computer readable medium of claim 17, wherein the second buffer is located at the head of the second list and wherein said allocating the second buffer removes the second buffer from the second list and adds the second buffer to the first list of buffers of the first log.

19. The non-transitory computer readable medium of claim 18, wherein buffers of the first list are ordered based on an order in which each buffer of the first list is allocated for the first log to record events for the first processing core.

20. The non-transitory computer readable medium of claim 18, subsequent to adding the first buffer to the allocation, the method further comprises performing processing including:

allocating a second plurality of buffers from the allocation pool for one or more of the plurality of logs, wherein subsequent to allocating the second plurality of buffers, said first buffer is at the head of the second list of buffers included in the allocation pool; and allocating the first buffer for a second log of the plurality of logs, wherein said second log is different from the first log, wherein said allocating the first buffer for the second log includes removing the first buffer from the allocation pool, adding the first buffer to a third list of buffers of the second log, and removing the first buffer from the first list of buffers for the first log.

21. The non-transitory computer readable medium of claim 15, wherein a distributed global memory includes a plurality of global memory portions of a plurality of computing modules, wherein the allocation pool of memory and the plurality of processing cores are included in a same one of the plurality of computing modules, wherein the allocation pool of memory is included in a first global memory portion of the distributed global memory, and wherein the first global memory portion is included in the same one computing module as the plurality of processing cores and wherein the first global memory portion is configured to be accessed locally by the plurality of processing cores without using an internal switching fabric.

* * * * *